United States Patent
Garcia et al.

(10) Patent No.: US 10,745,579 B2
(45) Date of Patent: Aug. 18, 2020

(54) EXTRUDABLE POLY(PROPYLENE) COMPOSITIONS

(71) Applicants: International Business Machines Corporation, Armonk, NY (US); Subsea 7 (US) LLC, Wilmington, DE (US)

(72) Inventors: Jeannette M. Garcia, San Leandro, CA (US); Alireza Rahimi, Fargo, ND (US); Robert D. Allen, San Jose, CA (US); John Hobbs, Katy, TX (US); Michael Firmian, Houston, TX (US)

(73) Assignees: International Business Machines Corporation, Armonk, NY (US); Subsea 7 (US) LLC, Wilmington, DE (US)

( * ) Notice: Subject to any disclaimer, the term of this patent is extended or adjusted under 35 U.S.C. 154(b) by 14 days.

(21) Appl. No.: 16/118,510

(22) Filed: Aug. 31, 2018

(65) Prior Publication Data

US 2020/0071557 A1 Mar. 5, 2020

(51) Int. Cl.
| | |
|---|---|
| *C09D 123/12* | (2006.01) |
| *C08K 5/00* | (2006.01) |
| *C08K 5/3415* | (2006.01) |
| *C08K 5/3442* | (2006.01) |
| *C08K 5/3492* | (2006.01) |
| *F16L 1/26* | (2006.01) |
| *F16L 13/02* | (2006.01) |
| *F16L 58/10* | (2006.01) |
| *F16L 58/18* | (2006.01) |

(52) U.S. Cl.
CPC ............ *C09D 123/12* (2013.01); *C08K 5/005* (2013.01); *C08K 5/3415* (2013.01); *C08K 5/3442* (2013.01); *C08K 5/3492* (2013.01); *F16L 1/26* (2013.01); *F16L 13/0272* (2013.01); *F16L 58/1054* (2013.01); *F16L 58/181* (2013.01)

(58) Field of Classification Search
None
See application file for complete search history.

(56) References Cited

U.S. PATENT DOCUMENTS

| | | | |
|---|---|---|---|
| 3,629,189 | A | 12/1971 | Minagawa et al. |
| 3,767,609 | A | 10/1973 | Gabler et al. |
| 3,135,656 | A | 5/1985 | Gabler et al. |
| 5,093,031 | A | 3/1992 | Login et al. |
| 5,369,171 | A | 11/1994 | Mulhaupt et al. |
| 6,120,904 | A | 9/2000 | Hostettler et al. |
| 8,404,780 | B2 | 3/2013 | Weaver et al. |
| 9,243,107 | B2 | 1/2016 | Hedrick et al. |
| 2004/0159654 | A1 | 8/2004 | Ryan et al. |
| 2007/0087131 | A1 | 4/2007 | Hutchinson et al. |
| 2014/0076483 | A1 | 3/2014 | Pirie et al. |
| 2014/0329080 | A1 | 11/2014 | Pbecker-Willinger et al. |
| 2017/0045178 | A1 | 2/2017 | Hoffmann et al. |
| 2018/0038542 | A1* | 2/2018 | Welles ............... B32B 7/12 |
| 2018/0118930 | A1* | 5/2018 | Howie ............... C08L 23/06 |

FOREIGN PATENT DOCUMENTS

| | | |
|---|---|---|
| EP | 3063452 B1 | 6/2017 |
| WO | 03087205 A1 | 10/2003 |
| WO | 2014017899 A1 | 1/2014 |
| WO | WO 2014017899 A1 | 1/2014 |

OTHER PUBLICATIONS

European Patent Office, International Search Report and Written Opinion, PCT/US2019/049224, dated Dec. 20, 2019.
Hughes, A. W., "Pipeline Field Joints", JPCL, Nov. 2014, p. 43-51.

* cited by examiner

*Primary Examiner* — Robert T Butcher
(74) *Attorney, Agent, or Firm* — Michael R. Roberts

(57) ABSTRACT

Extrudable compositions were prepared comprising poly(propylene) and a liquid additive comprising a lactam group. The compositions can comprise other optional additives that include a polyhemiaminal, antioxidants, UV light absorbers, and surfactants. The extruded compositions have higher percent elongation at break and lower Young's modulus compared to extruded poly(propylene) lacking the liquid additive. These and other property improvements make the extruded compositions attractive for forming field joint coatings for undersea pipeline applications.

26 Claims, 7 Drawing Sheets

EXTRUDABLE POLY(PROPYLENE) COMPOSITIONS

PARTIES TO A JOINT RESEARCH AGREEMENT

This invention was made under a joint research agreement between International Business Machines Corporation and Subsea 7.

BACKGROUND

The present invention relates to extrudable poly(propylene) compositions, and more specifically, to extrudable poly(propylene) compositions for use in pipelines.

Pipeline coatings made of poly(propylene) (PP) are an essential component of undersea applications. However, shortcomings in pipeline coating performance due to cracking, bond failures, adhesion issues, and mechanical failure persist.

The current pipeline coating technologies use PP or a mixture of PP with other polyolefins (e.g., high-density polyethylene or polystyrene) to extrude plastic coatings. Several factors negatively impact the performance of these coating plastics: exposure to sunlight can cause surface oxidation, de-colorization, and bond failure. Moreover, laying and installing pipelines undersea can result in stress cracks. The undersea environment can further degrade pipeline materials. The pipeline coating industry actively seeks alternative materials and formulations that can be extruded at high temperature and provide improved thermal and mechanical properties of the pipeline coatings.

SUMMARY

Accordingly, a composition is disclosed, comprising:
between 85 wt % and 95 wt % of poly(propylene); and
between 15 wt % and 5 wt % of a liquid additive in contact with the poly(propylene), the liquid additive comprising a lactam group; wherein
wt % is based on total weight of the composition.
Also disclosed is a method, comprising:
forming a composition comprising poly(propylene) and a liquid additive in contact with the poly(propylene), the liquid additive comprising a lactam group;
heating the composition with agitation at a temperature in the range of 90° C. to 120° C. for a period of time sufficient to form a homogeneous melt, wherein the liquid additive has a boiling point, and
extruding the melt at a temperature below the boiling point of the liquid additive, thereby forming an extruded composition.
Further disclosed is an extruded composition formed by the above-described method.
Another method is disclosed, comprising:
applying a composition onto a weld joint, the weld joint joining two parent pipes end-to-end, the composition comprising a poly(propylene) and a liquid additive in contact with the poly(propylene), the liquid additive comprising a lactam group; and
heating the applied composition, thereby forming a field joint coating disposed on the weld joint.

The above-described and other features and advantages of the present invention will be appreciated and understood by those skilled in the art from the following detailed description, drawings, and appended claims.

DETAILED DESCRIPTION

Figure 1A:
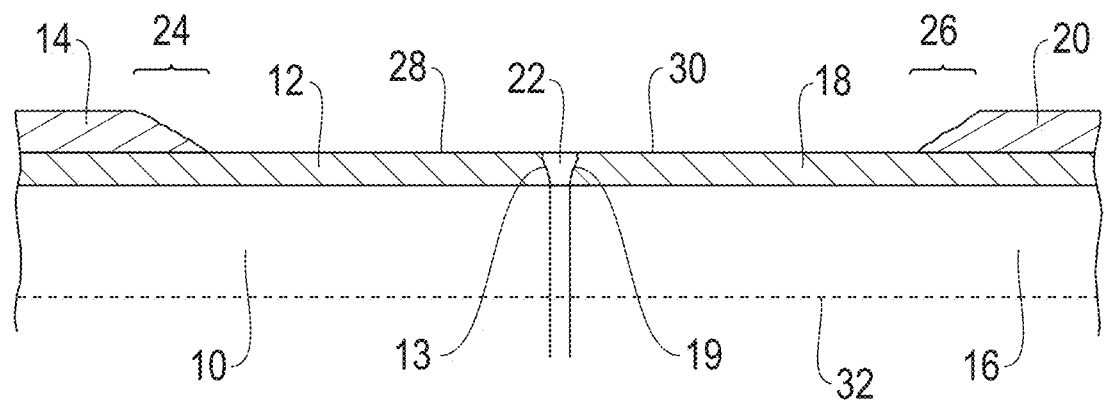
FIG. 1A is a cross-sectional diagram through the long axis of two parent pipes joined end-to-end by a weld joint.

Disclosed are poly(propylene) (PP) compositions for extrusion, and extruded thermoplastics formed therefrom. The compositions (also referred to herein as "formulations" or "blends") comprise PP and a liquid additive comprising a lactam group. The liquid additive has a boiling point above the temperature used for the extrusion process. The liquid additive forms a homogeneous blend with PP at the extrusion temperature. The compositions can further comprise a polyhemiaminal organogel, an antioxidant stabilizer, ultraviolet (UV) light absorbers, a surfactant, and/or other materials. The properties of the extruded compositions are particularly attractive for, but not limited to, undersea pipeline coating applications.

The extruded compositions exhibit improved properties compared to as-purchased poly(propylene), which is currently used in commercial products for pipeline applications. These include increased percent elongation at break, enhanced thermal stability; decreased Young's modulus and stiffness, decreased glass transition temperature (Tg), higher crystallization temperature (Tc), decreased shrinkage, and decreased induced strain hardening response under load. The extruded composition is generally a homogenous thermoplastic lacking defects or bubbles, and shows minimal or no leaching of the liquid additive. The above-mentioned properties of the extruded compositions are also improved relative to the properties of the as-purchased poly(propylene) after extrusion alone (i.e., with no additional materials added to the as-purchased poly(propylene)).

Liquid Additives

The liquid additive has a boiling point above the temperature used for extruding the composition. The liquid additives can be used singularly or in combination.

Preferred liquid additives are lactams of formula (1):

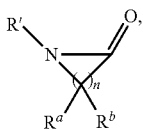

(1)

wherein
n is a positive integer having a value of 2 to 6,
R' is a monovalent $C_1$-$C_7$ alkyl group,
each $R^a$ is an independent monovalent radical selected from the group consisting of hydrogen and $C_1$-$C_{10}$ alkyl groups, and
each $R^b$ is an independent monovalent radical selected from the group consisting of hydrogen and $C_1$-$C_{10}$ alkyl group.

The alkyl group R' can be cyclic or non-cyclic, branched or non-branched. Non-limiting examples of liquid additives of formula (1) include N-methylpyrrolidone (NMP), M-ethylpyrrolidone (NEP), N-isopropylpyrrolidone (NIP), N-cyclohexylpyrrolidone (CHP), N-hexylpyrrolidone, 1,3-dimethylpyrrolidone, 1,4-dimethylpyrrolidone, 1,5-dimethylpyrrolidone, N-methylcaprolactam, and N-ethyl-3,3,5-trimethylcaprolactam, N-isobutylcaprolactam, N-tert-butylcaprolactam, N-methyl-4-methylcaprolactam, and N-methyloenantholactam. In an embodiment, the liquid additive is CHP.

Organogels

The organogels are polyhemiaminals (PHAs), which can be prepared by the reaction of a diamine and/or triamine and paraformaldehyde. The PHA is a crosslinked network comprising i) a plurality of trivalent hemiaminal groups of formula (2):

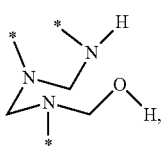

(2)

which are covalently linked to ii) a plurality of bridging groups of formula (3):

 (3), wherein y' is 2 or 3, and K' is a divalent or trivalent radical. K' can be a monomeric or polymeric moiety. Herein, atoms bearing a bond to an asterisk are covalently linked to an unspecified atom, represented by the asterisk, of another portion of the chemical structure. Each nitrogen of the hemiaminal group is covalently linked to a respective one of the K' bridging groups. A given K' bridging group can be covalently linked to a respective one of the hemiaminal nitrogens of formula (2) or a chain terminating *—NH₂ group.

As an example, a polyhemiaminal can comprise a substructure of formula (4):

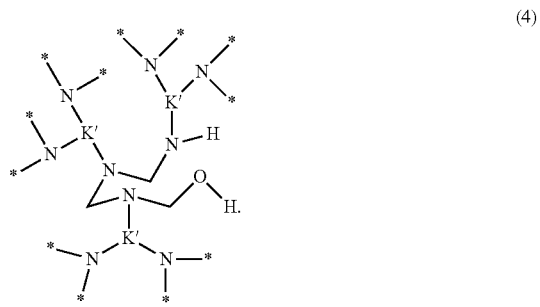

(4)

In this instance, each K' is a trivalent radical (y'=3). Each asterisk of formula (4) is an independent unspecified atom, which can be a chain terminating hydrogen or a carbon of a different hemiaminal group.

Non-limiting exemplary trivalent bridging groups include:

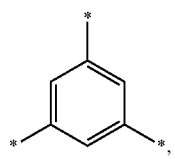

,

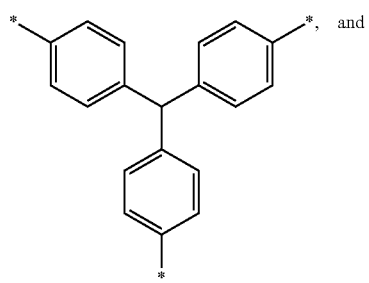

, and

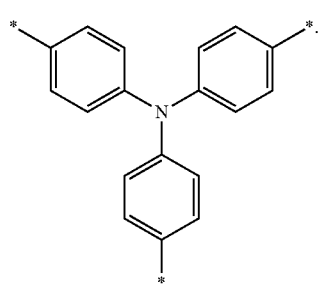

.

The bridging groups can be used singularly or in combination.

Polyhemiaminals composed of divalent bridging groups K' comprise a substructure of formula (5):

(5)

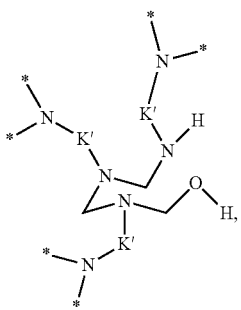

wherein K' is a divalent radical (y'=2 in formula (3)). Each asterisk of formula (5) is an independent atom, which can be a chain terminating hydrogen or a carbon of a different hemiaminal group.

More specific divalent bridging groups have the formula (6):

(6)

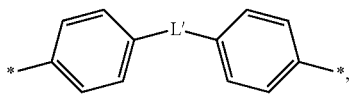

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$—*), and fluorenylidenyl:

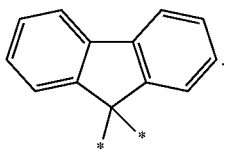 [SMILES: *C1(*)c2ccccc2-c2ccccc21]

Other bridging groups K' can comprise a poly(ethylene oxide) chain segment such as, for example:

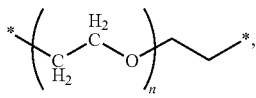

where n is a number having a value in the range of 10 to 10,000.

Other bridging groups K' can comprise a poly(dimethyl siloxane) chain segment such as, for example:

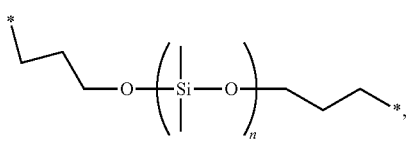

where n is a number having a value in the range of 10 to 10,000.

More specific polyhemiaminals are composed of divalent bridging groups of formula (6) comprising a substructure according formula (7):

(7)

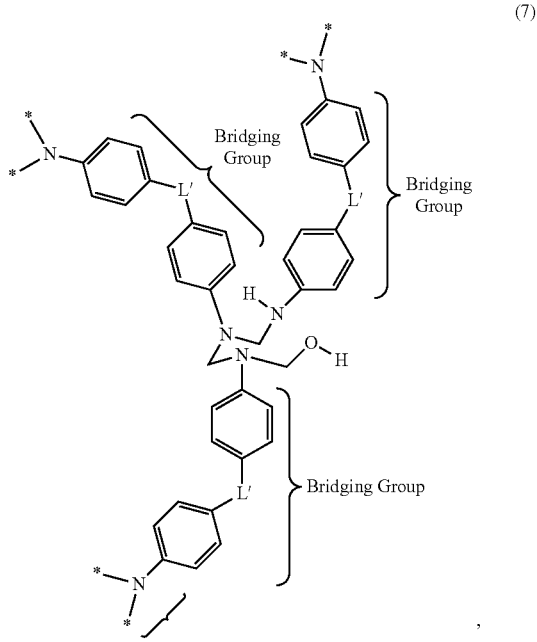

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each asterisk of formula (6) is an independent atom, which can be a chain terminating hydrogen or a carbon of a different hemiaminal group.

The hemiaminal groups can be bound non-covalently to water and/or a solvent. A non-limiting example is a hemiaminal group that is hydrogen bonded to two water molecules as shown in formula (8):

(8)

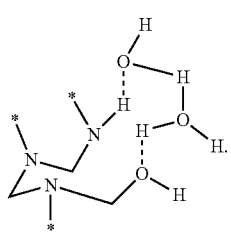

Exemplary non-limiting non-polymeric divalent bridging groups K' include the following groups.

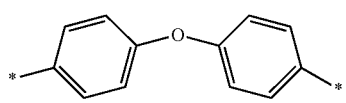

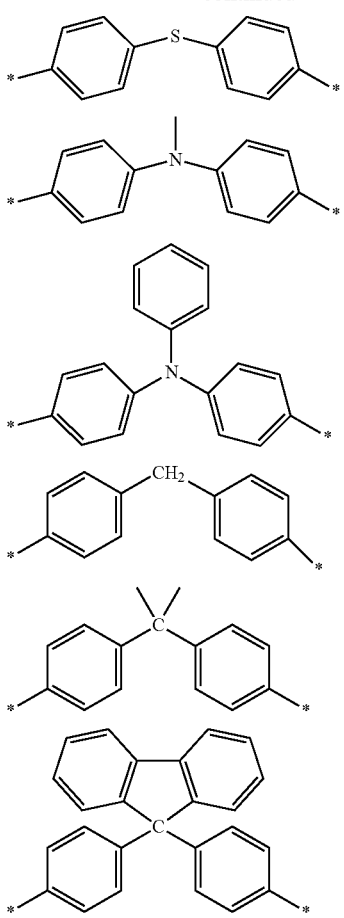

The divalent bridging groups can be used singularly or in combination.

The PHA can further comprise monovalent groups (referred to herein as diluent groups), which do not participate in chemical crosslinking and therefore can serve to control the crosslink density as well as the physical and mechanical properties of the PHA and PHT polymers. Monovalent diluent groups have a structure according to formula (9), formula (10), formula (11), and/or formula (12):

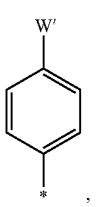 (9)

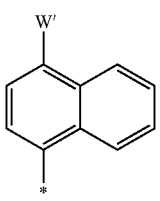 (10)

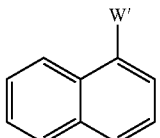 (11)

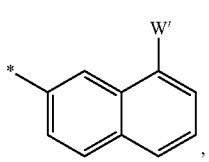 (12)

wherein W' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. Each asterisk in the above formulas (9)-(12) is linked to a nitrogen of a hemiaminal group.

Non-limiting exemplary diluent groups include:

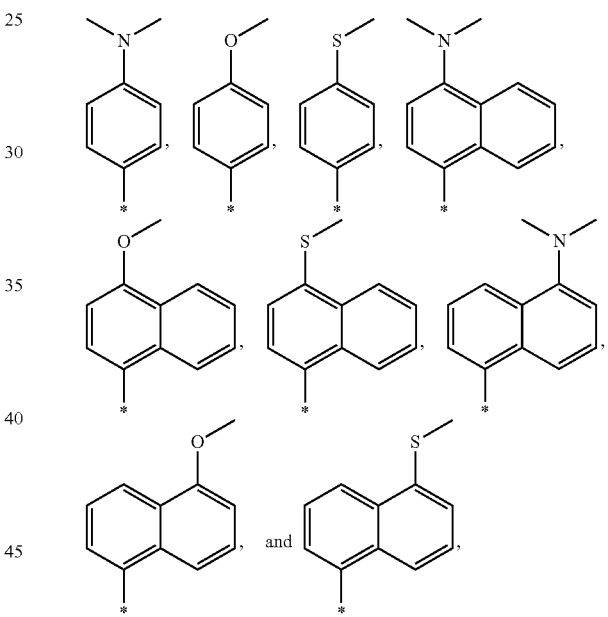

wherein the asterisk is a nitrogen of a hemiaminal group. Diluent groups can be used singularly or in combination.

A method of preparing a polyhemiaminal (PHA) comprising divalent bridging groups comprises forming a first mixture comprising i) a monomer comprising two or more primary amine groups, ii) an optional diluent monomer comprising one aromatic primary amine group, iii) paraformaldehyde, and iv) a solvent, which is preferably the liquid additive used for the extrudable composition. The first mixture is preferably heated at a temperature of about 20° C. to about 120° C. for about 1 minute to about 24 hours, thereby forming a second mixture comprising the PHA. In an embodiment, the monomer comprises two primary amine groups.

The mole ratio of paraformaldehyde: total moles of primary amine groups (e.g., diamine monomer plus optional monoamine monomer) is preferably about 1:1 to about 1.25:1, based on one mole of paraformaldehyde equal to 30 grams.

Non-limiting exemplary monomers comprising two primary amine groups include 4,4'-oxydianiline (ODA), 4,4'-methylenedianiline (MDA), fluorenylidene)dianiline (FDA), p-phenylenediamine (PD), 1,5-diaminonaphthalene (15DAN), 1,4-diaminonaphthalene (14DAN), and benzidene, which have the following structures:

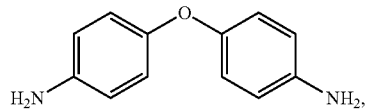
(ODA)

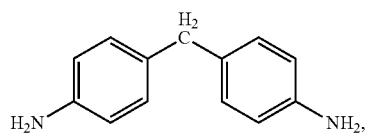
(MDA)

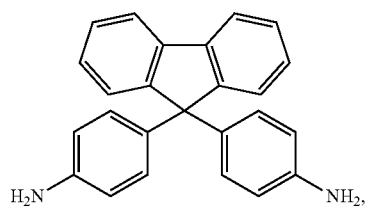
(FDA)

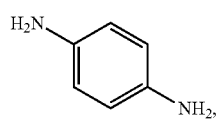
(PD)

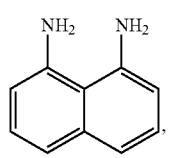
(15DAN)

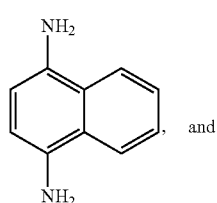
(14DAN), and

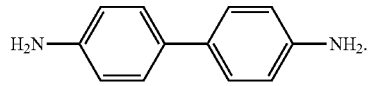
(benzidine)

Polymers having two terminal primary amine groups for forming polyhemiaminals include poly(ethylene glycol) diamine (PEG-diamine) and poly(dimethylsiloxane) diamine (PDMS-diamine), where each n is an independent number having an average value of 10 to 10,000:

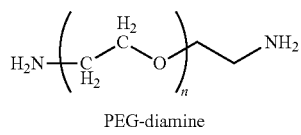
PEG-diamine

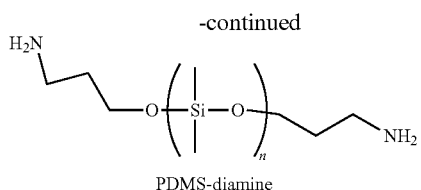
PDMS-diamine

In an embodiment, the diamine used to prepare the PHA is poly(ethylene glycol) diamine (PEG-diamine). The PEG-diamine can have a number average molecular weight (Mn) of about 100 to about 100,000. The resulting PHA is referred to herein as "PEG gel".

In another embodiment, the diamine used to prepare the PHA is poly(dimethyl siloxane) diamine (PDMS- diamine). The PDMS-diamine can have a number average molecular weight (Mn) of about 100 to about 100,000. The resulting PHA is referred to herein as "PDMS gel".

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

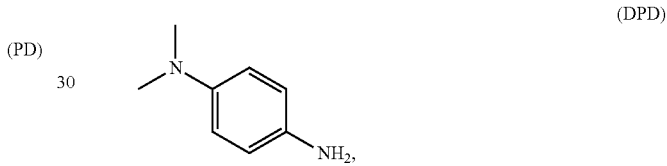
(DPD)

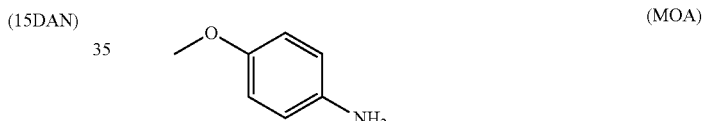
(MOA)

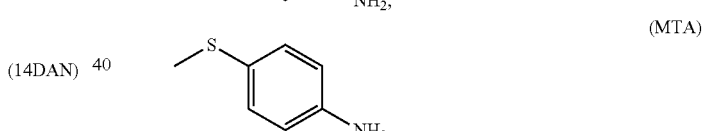
(MTA)

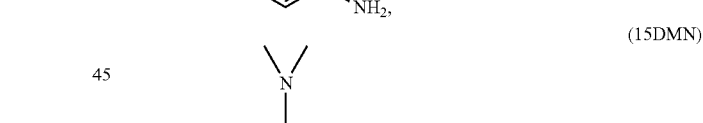
(15DMN)

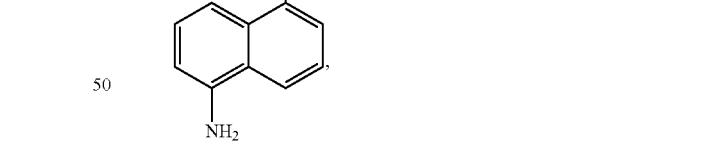
(14DMN), and

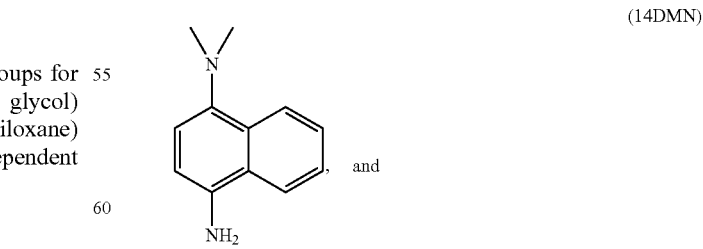
(DMB)

The diluent monomer can be used in an amount of 0 mole % to about 75 mole % based on total moles of monomer and diluent monomer.

The solvent used to prepare the polyhemiaminal is preferably a liquid additive for the disclosed extrudable compositions. In an embodiment, the solvent is selected from the group consisting of NMP, CHP, and combinations thereof.

Antioxidant Stabilizers

The compositions can optionally comprise an antioxidant stabilizer. The stabilizer preferably comprises a phenolic group. Herein, "phenolic group" is an aromatic ring covalently linked to at least one hydroxyl group. The aromatic ring can bear other substituents. Non-limiting exemplary antioxidant stabilizers comprising phenolic groups include 2,6-di-tert-butyl-4-methylphenol (BHT), 2,6-di-tert-butyl-4-cumylphenol, 2,6-di-tert-butyl-4-nonylphenol, 2,6-dicumyl-phenol, 2,6-di-tert-butyl-4-isooctylphenol, 4,4'-methylene-bis(2,6-di-tert-butylphenol), 2,2'-methylene-bis(4-methyl-6-tert-butylphenol, 3-tert-butyl-4-hydroxyanisole, 2-tert-butyl-4-hydroxyanisole, propyl gallate (PG), dodecyl gallate (DG), and tertiary-butylhydroquinone (TBHQ), pentaerythritol tetrakis(3-(3,5-di-tert-butyl-4-hydroxyphenyl)propionate (AO-1), octadecyl-3-(3,5-di-tert.butyl-4-hydroxyphenyl)-propionate (AO-2), and 1,3,5-Tri(4-tert-butyl-2,6-dimethyl-3-hydroxybenzyl)-1,3,5-triazine-2,4,6(1H,3H, 5H)-trione (AO-4).

Other non-limiting examples of antioxidant stabilizers include: n-octadecyl 3-(3,5-di-t-butyl-4-hydroxyphenyl)-propionate; n-octadecyl 3-(3,5-di-t-butyl-4-hydroxyphenyl)-acetate; n-octadecyl 3,5-di-t-butyl-4-hydroxybenzoate; n-hexyl 3,5-di-t-butyl-4-hydroxyphenylbenzoate; n-dodecyl 3,5-di-t-butyl-4-hydroxyphenylbenzoate; neo-dodecyl 3-(3, 5-di-t-butyl-4-hydroxyphenyl)propionate; dodecyl beta (3,5-di-t-butyl-4-hydroxyphenyl)propionate; ethyl alpha-(4-hydroxy-3,5-di-t-butylphenyl)isobutyrate; octadecyl alpha-(4-hydroxy-3,5-di-t-butylphenyl)isobutyrate; octadecyl alpha-(4-hydroxy-3,5-di-t-butyl-4-hydroxyphenyl)propionate; 2-(n-octylthio)ethyl 3,5-di-t-butyl-4-hydroxy- benzoate; 2-(n-octylthio)ethyl 3,5-di-t-butyl-4-hydroxy-phenylacetate; 2-(n-octadecylthio)ethyl 3,5-di-t-butyl-4-hydroxyphenylacetate; 2-(n-octadecylthio)ethyl 3,5-di-t-butyl-4-hydroxybenzoate; 2-(2-hydroxyethylthio)ethyl 3,5-di-t-butyl-4-hydroxybenzoate; diethyl glycol bis-(3,5-di-t-butyl-4-hydroxy-phenyl)propionate; 2-(n-octadecylthio) ethyl 3-(3,5-di-t-butyl-4-hydroxyphenyl)propionate; stearamido n,n-bis-[ethylene 3-(3,5-di-t- butyl-4-hydroxyphenyl)propionate]; n-butylimino n,n-bis-[ethylene 3-(3,5-di-t-butyl-4-hydroxyphenyl)propionate]; 2-(2-stearoyloxy-ethylthio)ethyl 3,5-di-t-butyl-4-hydroxybenzoate; 2-(2-stearoyloxyethylthio)ethyl 7-(3-methyl-5-t-butyl-4-hydroxyphenyl)heptanoate; 1,2-propylene glycol bi s-[3-(3, 5-di-t-butyl-4-hydroxyphenyl)propionate]; ethylene glycol bis-[3,5-di-t-butyl-4-hydroxyphenyl)propionate]; neopentylglycol bis43-[3,5-di-t-butyl-4-hydroxyphenyl)propionate]; ethylene glycol bi s-[3,5-di-t-butyl-4-hydroxypheny-lacetate); glycerine-1-n-octadecanoate-2,3-bis-(3,5-di-t-butyl-4-hydroxyphenylacetate); pentaethylthritol-tetrakis-[3-(3',5'-di-t-butyl-4-hydroxyphenyl)propionate]; hydroxyphenyl)propionate]; 1,1,1-trimethylol ethane-tris-3-[3,5-di-t-butyl-4-hydroxyphenyl)propionate]; sorbital hexa-[3-(3,5-di-t-butyl-4-hydroxyphenyl)propionate]; 2-hydroxyethyl 7-(3-methyl-5-t-butyl-4-hydroxyphenyl)propionate; 2-stearoyloxyethyl 7-(3 methyl-5-t-butyl-4-hydroxyphenyl) heptanoate; 1,6-n-hexanediol-bis[(3',5'-di-t-butyl-4-hydroxyphenyl)propionate; pentaerythritol-tetakis(3,5-di-tert-butyl-4-hydroxy hydrocinnamate). Hindered phenolic antioxidant compounds of the above types are available commercially, such as from Ciba Specialty Chemicals under the general trade designations "Irganox 1076" and "Irganox 1010".

Still other stabilizers include aromatic phosphites such as, for example, tris(2,4-di-tert-butylphenyl)phosphite (P-1), 2,4,6-tri-t-butylphenol-2-butyl-2-ethyl-1,3-propanediol phosphite, and tetrakis(2,4-di-tert-butylphenyl)[1,1-biphenyl]-4,4'diylbi sphosphonite.

The compositions can comprise the antioxidant stabilizer in an amount of 0.1 wt % to 1.0 wt % of the composition. The antioxidant stabilizers can be used singularly or in combination.

Other Additives

The compositions can comprise other additives such as, for example, ultraviolet UV light stabilizers, surfactants, and the like. These can be used individually in an amount of 0.1 wt % to 1.0 wt % of the composition based on total weight of the composition.

Poly(propylene)s

The composition can comprise one or more variants of poly(propylene) (e.g., two batches of poly(propylene) obtained from different sources that differ in number average molecular weight). Each variant of poly(propylene) can have a number average molecular weight (Mn) of about 1000 to about 1000000 and a weight average molecular weight of about 1500 to about 1500000. Each variant of poly(propylene) can have a polydispersity index whose value is in the range of 1.0 to 5.0.

Methods of Forming the Composition

In one method, the PP and liquid additive are combined at ambient temperature (e.g., a temperature in the range of 18° C. to 30° C.), thereby forming an initial mixture. A preferred PP:liquid additive weight ratio of the composition is between 95:5 and 85:15. The initial mixture is heated with agitation at a temperature below the boiling point at 1 atmosphere (atm) of the liquid additive, forming a pre-extrusion melt (pre-melt). Generally, a temperature in the range of 90° C. to 200° C. is suitable for forming the pre-melt. As a non-limiting example, when the liquid additive is N-cyclohexyl-2-pyrrolidone (CHP), which has a boiling point of 284° C. at 1 atm, the initial mixture can be heated at a temperature of 100° C. to 200° C. for 1 to 3 hours to form a pre-melt.

In another method, the PP is combined directly with an optional organogel comprising a polyhemiaminal and liquid additive (e.g., CHP-gel prepared with PEG-diamine and paraformaldehyde in CHP). The PP:organogel weight ratio can be between 85:15 and 95:5, more preferably between 88:12 and 92:8, based on total weight of the initial mixture. When present, the dry weight of the polyhemiaminal of the initial mixture can be about 0.8 wt % to 2.0 wt %, more preferably 0.9 to 1.1 wt %, based on total weight of the initial mixture. In an embodiment, the polyhemiaminal is prepared in the liquid additive (e.g., CHP, NMP) at a concentration of about 10.0 wt % based on total weight of the organogel, and this mixture is combined directly with PP to form the pre-melt using a PP:organogel weight ratio of between 85:15 and 95:5.

When preparing a pre-melt containing organogel and antioxidant stabilizer, it is preferable to first mix PP pellets and any antioxidant first, followed by organogel.

The initial mixture can be treated in two ways before the extrusion. If the initial mixture contains no organogel, the initial mixture can be promptly extruded after stirring the initial mixture at a temperature and for a time effective in forming a homogeneous pre-melt. The preferred temperature of mixing is in the range of 90° C. to 200° C. and the preferred mixing time is 1-3 hours. If the initial mixture contains an organogel, the preferred mixing conditions are 90° C. to 200° C. for 1 to 3 hours. These conditions favor the organogel forming a homogeneous pre-melt with PP. The mixing step also mitigates sudden gas evolution that may occur during the extrusion due to separation and trapping of excess liquid additive in the extruder.

Extrusions

No restriction is placed on the extrusion equipment or conditions, providing the device and conditions used for the extrusion do not adversely affect the desirable properties of the extruded compositions.

The pre-melt can be extruded at a temperature in the range of 120° C. to 350° C., more specifically 180-280° C., and even more specifically 180° C. to 250° C. In an embodiment, the extrusion is performed at a temperature of 200° C. to 240° C.

Preferably, the pre-melt is extruded at a temperature below the boiling point of the liquid additive at 1 atm pressure, generally 90° C. to 300° C. As a non-limiting example, when the liquid additive is CHP, the pre-melt can be extruded at a temperature in the range of about 120° C. to about 260° C., more preferably 180° C. to 240° C., and most preferably 210° C. to 230° C. The extruded composition generally contains 90 to 100% of the liquid additive of the initial mixture.

The extruded compositions can comprise poly(propylene) in an amount of between 85 wt % to less than 95 wt %, more preferably 88 to 92 wt % based on total weight of the composition. The liquid additive can be present in the extruded composition in an amount of between 15 wt % and 5 wt %, more preferably between 12 wt % and 8 wt % based on total weight of the composition. When present, the extruded composition can comprise the polyhemiaminal in an amount between 0.8 wt % to 2 wt %. When present, the extruded compositions can comprise antioxidant stabilizer in an amount of 0.1 to 1.0 wt %, more preferably 0.2 to 0.5 wt % based on total weight of the composition.

Applications

Also disclosed are methods of coating pipes using the PP compositions, in particular to coating pipeline field joints. Further disclosed are pipelines having field joints coated by these methods.

Pipelines used in the oil and gas industry are usually formed of lengths of steel pipe, referred to herein as "parent pipe", which are welded together end-to-end before the finished pipeline is laid. The parent pipe comprises a steel cylindrical shaped core and a protective coating disposed on a portion of the outer surface of the core. The protective coating is referred to herein as the "parent coating". The parent coating is designed to mitigate corrosion of the pipeline in use, and optionally also to insulate the fluids that the pipeline carries in use. The parent coating is applied before welding the parent pipe sections end-to-end. A short length of the steel core is left uncoated at each end of the parent pipe in order to facilitate welding.

Many variations are possible in the structure and composition of the parent coating to obtain the required protective or insulative properties. However, poly(propylene) (PP) is most commonly used for the parent coating. The parent coating can comprise one or more layers. The PP is typically applied onto an anti-corrosion base layer, which is applied on the steel surface of a pipe section. A non-limiting example of a corrosion base layer is a fusion-bonded epoxy (FBE) coating.

The PP of the parent coating can also be applied in one or more layers to form a parent coating. A three-layer PP (3LPP) parent coating may be used for corrosion protection. Additional layers may be used if greater thermal insulation is needed, such as in a 5LPP or 7LPP coating, where "5L" and "7L" refer to 5 layer and 7 layer, respectively.

The welded portion joining two parent pipes end-to-end is referred to herein as the "weld joint" or "field joint" because the welding generally takes place during pipe laying operations. The weld joint and any surrounding unprotected portion of the parent pipes joined by the weld joint must be coated with a protective material to mitigate corrosion and to maintain whatever degree of insulation is necessary for the purposes of the pipeline. The coated protective material is referred to as a "field joint coating".

The "field joint coating" should not be confused with the parent coating. A field joint coating is a film that wraps around and is disposed on the weld joint. Typically, the field joint coating extends over any unprotected core surface of each of the two joined parent pipes, and overlaps a portion of the parent coating of each of the joined pipes. The area in which a portion of the parent coating is in contact with the field joint coating is referred to herein as the "overlap area".

Herein, a "finished pipeline" ready to be laid comprises i) at least two parent pipes joined end-to-end by a weld joint and ii) a field jointing coating disposed on the weld joint.

When a pipeline is laid offshore, welding and field joint coatings are commonly performed aboard a pipe-laying vessel that fabricates and launches the finished pipeline using S-lay or J-lay methods. Welding and field joint coating may also be performed onshore at a spoolbase, where pipe joints are firstly joined to form long pipe stalks and the pipe stalks are later joined successively end-to-end to form a continuous pipe for spooling onto a visiting reel-lay vessel.

The present compositions are promising candidates for field joint coatings. A method of forming a field joint coating using the disclosed composition comprises disposing the composition circumferentially around a weld joint joining two parent pipes end-to-end, and heating the disposed composition using conditions suitable for inducing good adhesion of the composition to the weld joint. The finished field joint comprises a layer of the heated composition in contact with the outside surface of the welded section. In an embodiment, the parent pipe comprises a protective coating, and the finished field joint overlaps a portion of the protective coating of the parent pipe.

In the following drawings, it should be understood that the drawings are for illustrative purposes and are not drawn to scale.

FIG. 1A is a cross-sectional diagram through the long axis of two parent pipes joined end-to-end by a weld joint. Center line 32 of the joined pipes is indicated by a dashed line. First parent pipe 10 comprises cylindrically shaped first core 12, circularly shaped first end 13, and cylindrically shaped first parent coating 14 disposed on first core 12. Second parent pipe 16 comprises cylindrically shaped second core 18, circularly shaped second end 19, and cylindrically shaped second parent coating 20 disposed on second core 18. Chamfered area 24 of first parent coating 14 and chamfered area 26 of second parent coating 20 are indicated. First exposed surface 28 of first parent pipe 10 and second exposed surface 30 of second parent pipe 16 are also indicated. First parent pipe 10 is joined to second parent pipe 16 by weld joint 22, which can be formed by any suitable welding process. Weld joint 22 has contact with the full circumferences of first end 13 and second end 19 (not shown).

Figure 1B:
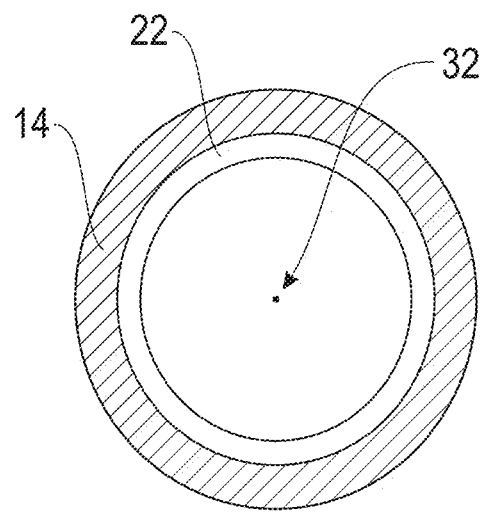
FIG. 1B is a cross-sectional diagram of the joined parent pipes of FIG. 1A where the sectional cut is made at the weld joint perpendicular to the center line and viewed toward the first parent pipe.

FIG. 1B is a cross-sectional diagram of the joined parent pipes of FIG. 1A where the sectional cut is made at weld joint 22 perpendicular to center line 32 and viewed toward first parent pipe 10. Center line 32 is indicated by a point. Weld joint 22 and first parent coating 14 are indicated. Similarly, when viewed toward second parent pipe 20, weld joint 22 and second parent coating 20 would be appear as concentric circles around center line 32, seen as a point (not shown).

Figure 1C:
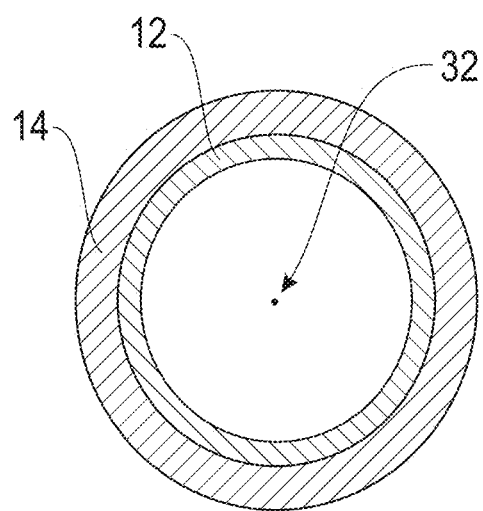
FIG. 1C is a cross-sectional diagram of the joined parent pipes of FIG. 1A where the sectional cut is made through the chamfered area of first parent pipe perpendicular to the center line and viewed in the direction of the first parent pipe.

FIG. 1C is a cross-sectional diagram of the joined parent pipes of FIG. 1A where the sectional cut is made through chamfered area 24 perpendicular to center line 32 and viewed in the direction of first parent pipe 10. Center line 32 is indicated by a point. First core 12 and first parent coating 14 are indicated. Similarly, when viewed toward second parent pipe 20, second core 18 and second parent coating 20 would be appear as concentric circles around center line 32, seen as a point (not shown).

Figure 2A:
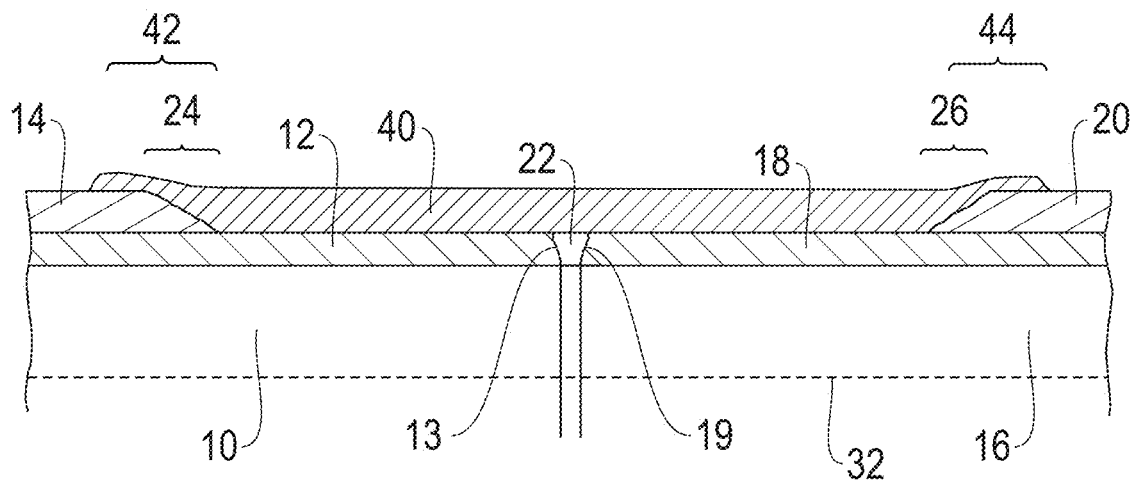
FIG. 2A is a longitudinal cross-sectional diagram illustrating the two parent pipes joined by the weld joint of FIG. 1A after applying a field joint coating.

FIG. 2A is a longitudinal cross-sectional diagram illustrating the two parent pipes joined by weld joint 22 of FIG. 1A after applying field joint coating 40. The field joint coating can comprise one (shown) or more layers (not shown). Field joint coating 40 is circumferentially disposed on first parent coating 14 in overlap area 42. Field joint coating 40 is circumferentially disposed on second parent coating 20 in overlap area 44. Field joint coating 40 also is circumferentially disposed on first core 12 and second core 18.

Figure 2B:
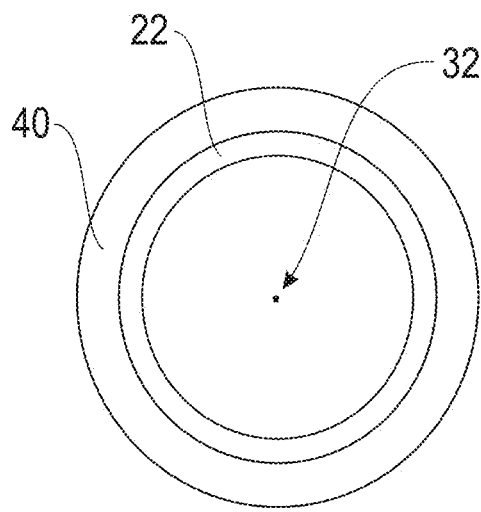
FIG. 2B is a cross-sectional diagram of the joined parent pipes of FIG. 2A where the sectional cut is made at the weld joint perpendicular to the center line and viewed in the direction of the first parent pipe.

FIG. 2B is a cross-sectional diagram of the joined parent pipes of FIG. 2A where the sectional cut is made at weld joint 22 perpendicular to center line 32 and viewed in the direction of first parent pipe 10. Center line 32 is indicated by a point. Weld joint 22 and field joint coating 40 are indicated. Similarly, when viewed toward second parent pipe 20, weld joint 22 and field joint coating 40 would be appear as concentric circles around center line 32, seen as a point (not shown).

Figure 2C:
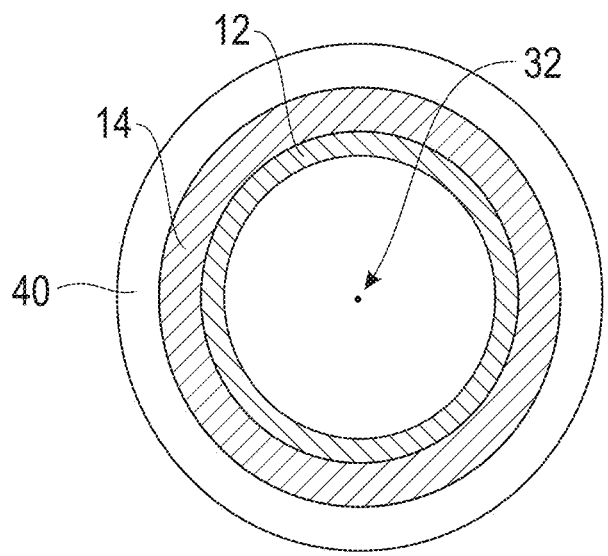
FIG. 2C is a cross-sectional diagram of the joined parent pipes of FIG. 2A where the sectional cut is made through the chamfered area of the first parent pipe perpendicular to the center line and viewed in the direction of the first parent pipe.

FIG. 2C is a cross-sectional diagram of the joined parent pipes of FIG. 2A where the sectional cut is made through chamfered area 24 perpendicular to center line 32 and viewed in the direction of first parent pipe 10. Center line 32 is indicated by a point. First core 12, first parent coating 14, and field joint coating 40 are indicated. Similarly, if viewed toward second parent pipe 20, then second core 18, field joint coating 40, and second parent coating 20 would appear as concentric circles around center line 32, seen as a point (not shown).

High-quality field joint coatings are important to ensure effective protection and insulation throughout the long design life of a subsea pipeline. It is also important that field joint coating operations can be completed quickly enough that they do not adversely delay the chosen fabrication process. This is a particular concern in an S-lay operation (i.e., where the pipeline exits the vessel horizontally), where stepwise parallel processing in successive work stations allows the highest fabrication rate to minimize tie-up of a valuable pipe-laying vessel. However, it is emphasized that the compositions are not limited to S-lay operations or to use on a pipe-laying vessel. The compositions can be employed in J-lay operations (i.e., where the pipeline exits the vessel vertically) or at an on-shore spool base supporting reel-lay operations (the pipeline is finished in a factory and reeled on a spool for laying at sea).

The compositions can be applied in the form of a powder, a sheet, a tape, or a liquid melt. The field joint coating can be formed using any suitable apparatus (e.g., a rotary yoke or carriage that turns around a pipe to apply a coating to an external surface of the pipe, a tubular cast-molding device or injection molding device that surrounds the field joint with a cavity to be filled by a molten form of the composition). The layer of coating material can be applied to the field joint continuously from a dispenser in the form of a sheet, liquid, or powder. Alternatively, an extruder that produces a sheet of field joint coating material can be mounted to turn around the pipe while a pressing roller compacts the applied sheet.

The field joint coating can have similar mechanical and chemical properties to the parent coating. Also, compatible thermoplastics materials of the parent coating and the field joint coating can fuse together at their mutual interface (overlap area), thereby resisting cracking and providing longer service life.

In general, heating is used in the art of field joint coating to melt a sheet or to shrink a sheet. It is also known in the art of field joint coating for a mold, sleeve or collar encircling a pipe to include electrical heating wires. Typically, the heating wires are located only where sealing or fusing has to be achieved, namely at the interface with the parent coating and at seams of the mold, sleeve or collar.

Another method of forming a field joint coating comprises: placing at least one body comprising the disclosed composition around the field joint; heating the body in a mold cavity around the field joint, thereby effecting thermal expansion of the disclosed composition; and constraining thermal expansion of the body in the mold cavity to apply elevated pressure between the body and pipe sections joined at the field joint. After elevated pressure has been held between the body and the pipe sections, the body may be cooled in the mold cavity to form the field joint coating. The method improves bonding and fusing between the body, which forms a field joint coating, and the parent coatings and the exposed pipe sections of the pipe joints. Yet, it is not essential that the body is fully molten, which greatly reduces the mold residence time including in-mold heating and cooling phases.

Interface surfaces of the body may be heated to soften them even if the internal bulk of the body remains cool enough to be solid. Thus, the body can be pre-heated to a temperature below a melting point of the disclosed composition, although it is possible to pre-heat an external surface of the body to a higher temperature than the internal bulk of the body and possibly to a softening or melting temperature while the internal bulk remains solid.

To promote bonding and fusing where required while minimizing addition of heat to the system, it is possible to selectively pre-heat a side of the body that will be inward to a higher temperature than a side of the body that will be outward.

The body can be pre-heated before placing the body around the field joint. For ease of handling, the body is preferably of self-supporting solidi before the body is placed around the field joint.

The body may be placed around the field joint by assembling two or more body elements around the field joint. Similarly, two or more mold tool elements may be assembled around the field joint to make a mold tool that defines the mold cavity, suitably after the body has been placed around the field joint.

If one or more of the body elements are attached to each mold tool element, two or more body elements can be assembled around the field joint by assembling two or more mold tool elements around the field joint to make a mold tool that defines the mold cavity.

If the mold cavity has a first volume, then on being placed around the field joint, the body suitably has a second volume selected such that the body can fit into the mold cavity. In that case, the body has a coefficient of thermal expansion such that, when heated in the mold cavity, the body would expand to a volume greater than the first volume if such thermal expansion were not constrained.

Thus, the inventive concept also finds expression in a system for coating a field joint of a pipeline. The system comprises: a mold tool that may be positioned around the field joint to define a mold cavity of a first volume; a body comprising the disclosed composition, the body being arranged to fit into the mold cavity and having a second volume selected such that the body can fit into the mold cavity; and a heating system for heating the body in the mold cavity to effect thermal expansion of the body. The body has a coefficient of thermal expansion such that, when heated in the mold cavity to a temperature at which interface surfaces of the body are capable of fusing or bonding with the parent coatings and the exposed pipe sections of the pipe joints, the body would expand to a third volume greater than the first volume if such thermal expansion were not constrained by the mold tool.

The inventive concept extends to a pipeline production facility performing the method of the invention or comprising the system of the invention. The inventive concept also embraces a pipeline or a field joint coating for a pipeline, produced by performing the method of the invention, by the system of the invention or by the pipeline production facility of the invention.

Thermal and mechanical analysis of the extruded compositions were compared to extruded control PP (extruded as-purchased PP), which is currently used for undersea pipeline coatings. In all cases, the extruded compositions showed enhanced percent elongation-at-break values (12 to 42% higher than control samples), improved thermal stability, decreased Young's modulus (−23 to −50% lower compared to control samples), lower glass transition (Tg), reduced crystallinity, and decreased post-extrusion shrinkage after cooling compared to the extruded control PP. The extruded compositions also showed strain hardening characteristics at high loads.

Furthermore, finite element analysis (FEA) of pipeline lap joints showed a decrease in the maximum PP strain values of end of overlap (−20 to −42%) and top angle (−17 to −36%), which are desirable. The lap joints are the overbuilds on a pipeline field joint coating that is part of the support for the injection to the parent coating. The exact amount of property improvement varied depending on the source of the poly(propylene).

The examples below illustrate the materials and methods of this invention. PP pellets were obtained from four different sources, designated PP1, PP2, PP3, and PP4. These batches are also referred to herein as "as-purchased PP". The chemical specifications of each batch were unknown (e.g., amount and identity of blended stabilizers/antioxidants, co-polymers, etc., were unknown). The as-purchased PP and the disclosed compositions were separately melt-extruded using the same equipment and conditions. The thermal and mechanical properties of the extruded materials were then compared.

EXAMPLES

Materials used in the following examples are listed in Table 1.

TABLE 1

| ABBREVIATION | DESCRIPTION | SUPPLIER |
|---|---|---|
| AO-1 | Antioxidant, pentaerythritol tetrakis(3-(3,5-di-tert-butyl-4-hydroxyphenyl)propionate | Sigma Aldrich |
| AO-4 | Antioxidant, 1,3,5-Tri(4-tert-butyl-2,6-dimethyl-3-hydroxybenzyl)-1,3,5-triazine-2,4,6(1H,3H,5H)-trione | Sigma Aldrich |
| BHT | Butylated hydroxytoluene, also called 2,6-di-tert-butyl-4-methylphenol | Sigma Aldrich |
| CHP | N-Cyclohexyl pyrrolidone, b.p. 284° C. at 1 atm | Sigma Aldrich |
| NMP | N-Methylpyrrolidone b.p. 202° C. at 1 atm | Sigma Aldrich |
| P-1 | Antioxidant, tris(2,4-di-tert-butylphenyl)phosphite | Sigma Aldrich |
| PAPA | Poly(azaleic anhydride) | Broadview Technologies Inc |
| PSPA | Poly(sebacic anhydride) | Broadview Technologies Inc |
| PLURONIC ® F-127 | Surfactant | Sigma Aldrich |
| PDMS-diamine | Poly(dimethyl siloxane) diamine (amine terminated) | Gelest |
| PEG-diamine | Poly(ethylene glycol) diamine (amine terminated) | NOF America Corporation |
| PF | Paraformaldehyde | Sigma Aldrich |
| PP1 | Poly(propylene) pellets, N01G-02 Polypropylene Impact Copolymer | Subsea7 |
| PP2 | Poly(propylene) pellets, N02G-00 Polypropylene Impact Copolymer | Subsea7 |
| PP3 | Poly(propylene) pellets, Borcoat EA 165 | Subsea7 |
| PP4 | Poly(propylene) pellets, Basel Hifax CA 197 J White | Subsea7 |

In the following preparations, weight percent (wt %) is based on total weight of the mixture. The term "NMP additive" means NMP solvent was used as an additive. The term "CHP additive" means CHP solvent was used as an additive.

Preparations of Organogels

The polyhemiaminal organogels were prepared according to the general procedures of U.S. Pat. No. 9243107 B2.

Example 1

Preparation of Cyclohexyl Pyrrolidone (CHP) Organogel (also Referred to herein as CHP-Gel)

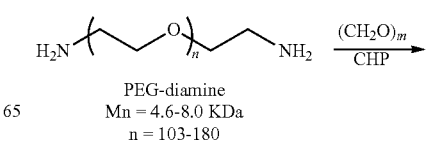

PEG-diamine
Mn = 4.6-8.0 KDa
n = 103-180

-continued

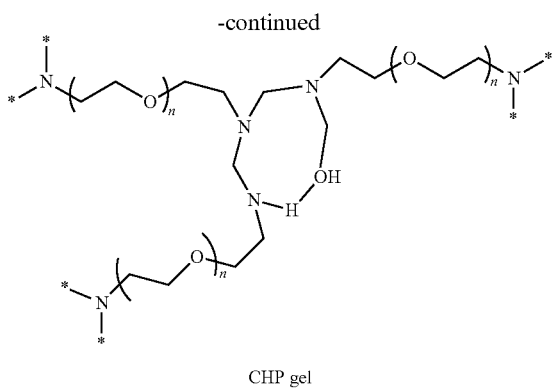

CHP gel

CHP (9.0 g, 90 wt %), polyethylene glycol diamine (PEG-diamine, 1.0 g, 10 wt %), and paraformaldehyde (PF, 0.017 g, ~4.4 equivalents bases on primary amine content, ~0.16 wt %, cross-linker) were combined and heated under nitrogen with agitation at 50° C. for 30 minutes, forming the CHP-gel. In the examples below, the amount of CHP-gel used includes the solvent CHP used to make the organogel. The initial mixture with poly(propylene) pellets contained CHP-gel in an amount of 9.9 wt % based on total weight of the initial mixture. The PEG-diamine and PF portions were ~1 wt % of the initial mixture.

Example 2

Preparation of N-methyl pyrrolidone (NMP) organogel (also referred to herein as NMP-gel). NMP (9.0 g, 90 wt %), PEG-diamine (1.0 g, 10 wt %), and paraformaldehyde (PF, 0.017 g, ~4.4 equivalents bases on primary amine content, ~0.16 wt % cross-linker) were combined and heated under nitrogen with agitation at 50° C. for 30 minutes, forming the NMP-gel. In the examples below, the amount of NMP-gel used includes the solvent NMP used to make the organogel. The initial mixture with poly(propylene) pellets contained NMP-gel in an amount of 9.9 wt % based on total weight of the initial mixture. The PEG-diamine and PF portions were ~1 wt % of the initial mixture.

NMP-Based Compositions and Extrusions

Example 3

NMP-gel formulation with oven heat step. PP1 pellets (as supplied by manufacturer, 90.0 g, 89.78 wt %) were mixed with BHT antioxidant (butylated hydroxytoluene, also referred to as 2,6-di-tert-butyl-4-methylphenol, 0.25 g, 0.24 wt %) and NMP organogel (10.0 g, 9.97 wt %). The mixture was heated in an oven at 120° C. for 3 hours. The mixture was removed every hour and manually stirred to ensure pellets mixed with the other components and did not stick to flask walls or each other. The mixture was extruded through a Dohle Company DX275 6007 CS-P extruder equipped with a 1.0 cm slot die. The extruder temperature was 220° C. Extruded samples were pressed to a thickness of 2.5-4.0 mm. The extruded samples exhibited excessive gas evolution.

Example 4

NMP additive formulation with oven-heat step. PP pellets (supplied by manufacturer, 90.0 g, 89.78 wt %) were mixed with BHT antioxidant (0.25 g, 0.24 wt %) and NMP solvent (10.0 g, 9.97 wt %). The mixture was heated in an oven at 120° C. for 3 hours. The mixture was removed every hour and manually stirred to ensure pellets mixed with the other components and did not stick to flask walls or each other. The mixture was extruded through a Dohle Company DX275 6007 CS-P extruder equipped with a 1.0 cm slot die. The extruder temperature was 220° C. Extruded samples were pressed to a thickness of 2.5-4.0 mm. The extruded samples exhibited excessive gas evolution.

Example 5

NMP additive formulation without oven-heat step. PP1 pellets (as supplied by manufacturer, 90.0 g, 89.78 wt %) were mixed with BHT antioxidant (0.25 g, 0.24 wt %) and NMP (10.0 g, 9.97 wt %). The mixture was manually stirred for five minutes to ensure complete pellet coating with additives. The mixture was extruded through a Dohle Company DX275 6007 CS-P extruder equipped with a 1.0 cm slot die. The extruder temperature was 220° C. Extruded samples were pressed to a thickness of 2.5-4.0 mm. The extruded samples exhibited excessive gas evolution.

Table 2 lists the properties of Examples 3-5. Td is the decomposition temperature, Tm is the melting temperature, Tc is the crystallization temperature, and Tg is the glass transition temperature. When two values of Td are shown, the first Td temperature corresponds to an initial 2% weight loss in the TGA experiment, which was attributed to loss of the liquid additive (e.g., CHP or NMP). The second Td temperature is the final decomposition temperature. "Elong. %" is the percent elongation at break of the sample. Percent elongation at break=(Elongation at break (mm))/(Initial die height (mm))×100. Test protocols for elongation followed ASTM D639. "Elong. Ratio" is elongation ratio, the ratio of the percent elongation at break of the sample to the percent elongation at break of the Extruded PP1 (Control 2). A desired elongation ratio is greater than 1.0, more preferably 1.20 or higher. Slashes/dashes means the analysis could not be performed for the property(s) and no value is available to report. This can be due to poor quality of the extruded sample caused by, for example, additive leaching, gas evolution, and/or bubble formation.

TABLE 2

| Example | Description | Td °C. | Tm °C. | Crystallinity % | Tc °C. | Tg 1 °C. | Tg 2 °C. | Young's Modulus (MPa) | Elong. %[a] | Elong. Ratio |
|---|---|---|---|---|---|---|---|---|---|---|
| Control 1 | As-purchased PP1 | 311.00 | 168.79 | 47.60 | 117.94 | — | — | — | — | — |
| Control 2 | Extruded PP1 | 317.13 | 167.17 | 69.66 | 119.34 | −36.44 | 15.09 | 0.46 | 472.00 | |
| 3 | PP1 + NMP-gel | 180.45 321.35 | 165.65 | 57.00 | 125.36 | −34.52 | 6.51 | 0.42 | 480.00 | 1.01 |

TABLE 2-continued

| Example | Description | Td °C. | Tm °C. | Crystallinity % | Tc °C. | Tg 1 °C. | Tg 2 °C. | Young's Modulus (MPa) | Elong. %$^a$ | Elong. Ratio |
|---|---|---|---|---|---|---|---|---|---|---|
| 4 | PP1 + NMP | 179.55 321.18 | 168.32 | 49.00 | 128.52 | −33.89 | — | 0.38 | 490.00 | 1.04 |
| 5 | PP1 + NMP | 189.12 329.03 | 164.75 | 44.80 | 121.18 | −35.25 | — | 0.39 | 505.00 | 1.07 |

The data of Table 2 show that the combination of NMP gel and stabilizer additives slightly increased the final decomposition temperature Td and lowered the Young's modulus relative to Control 2. The % elongation at break increased only slightly over Control 2, resulting in an elongation ratio between 1.0 and 1.1.

CHP-Based Compositions and Extrusions

Example 6

CHP-gel formulation with oven heat step. PP1 or PP2 pellets (as supplied by manufacturer, 90.0 g, 89.78 wt %) were combined with BHT antioxidant (0.25 g, 0.24 wt %) and CHP-gel (10.0 g, 9.97 wt %). The mixture was heated in an oven at 120° C. for 3 hours. The mixture was removed every hour and manually stirred to ensure pellets mixed with the other components and did not stick to flask walls or each other. The mixture was extruded through a Dohle Company DX275 6007 CS-P extruder equipped with a 1.0 cm slot die. The extruder temperature was 220° C. Extruded samples were pressed to a thickness of 2.5-4.0 mm. The formulation extruded samples had no surface defects or bubbles by visual inspection and by scanning electron microscopy (SEM) imaging.

Example 7

CHP additive formulation with oven-heat step. PP1 or PP2 pellets (supplied by manufacturer, 90.0 g, 89.78 wt %) were mixed with BHT antioxidant (0.25 g, 0.24 wt %) and CHP (10.0 g, 9.97 wt %). The mixture was heated in an oven at 120° C. for 3 hours. The mixture was removed every hour and manually stirred to ensure pellets mixed with the other components and did not stick to flask walls or each other. The mixture was extruded through a Dohle Company DX275 6007 CS-P extruder equipped with a 1.0 cm slot die. The extruder temperature was 220° C. Extruded samples were pressed to a thickness of 2.5-4.0 mm. The formulation extruded samples had no surface defects or bubbles by visual inspection and by scanning electron microscopy (SEM) imaging.

Example 8

CHP additive formulation without oven-heat step. CHP additive formulation without oven-heat step. PP1 pellets (supplied by manufacturer, 90.0 g, 89.78 wt %) were mixed with BHT (0.25 g, 0.24 wt %) and CHP (10.0 g, 9.97 wt %). The mixture was manually stirred for five minutes to ensure complete pellet coating with additives. The mixture was extruded through a Dohle Company DX275 6007 CS-P extruder equipped with a 1.0 cm slot die. The extruder temperature was 220° C. The extruded samples were pressed to a thickness of 2.5-4.0 mm. The extruded samples had no surface defects or bubbles by visual inspection and by scanning electron microscopy (SEM) imaging.

Effect of PF on CHP Extrusion Compositions

Example 9 (Comparative).

To determine effects of PF on the final product, a mixture was prepared according to the general procedure of Example 7 containing CHP (9.0 g, 8.97 wt %), PEG-diamine (1.0 g, 1 wt %), PP1 pellets (90.0 g, 89.78 wt %), and BHT (0.25 g, 0.24 wt %). No PF was added to this formulation. The mixture was extruded at 220° C. The thermal and mechanical properties of the samples collected were similar to the formulation of CHP-gel (Example 6).

Table 3 summarizes the properties of the samples of Examples 6-9.

TABLE 3

| Example | Description | Td °C. | Tm °C. | Crystallinity % | Tc °C. | Tg 1 °C. | Tg 2 °C. | Young's Modulus (MPa) | Elong. %$^a$ | Elong. Ratio |
|---|---|---|---|---|---|---|---|---|---|---|
| Control 1 | As-purchased PP1 | 311.00 | 168.79 | 47.60 | 117.94 | — | — | — | — | — |
| Control 2 | Extruded PP1 | 317.13 | 167.17 | 69.66 | 119.34 | −36.44 | 15.09 | 0.46 | 472.00 | |
| 6 | PP1 + CHP-gel | 182.31 337.33 | 162.47 | 47.00 | 123.57 | −35.81 | 6.51 | 0.32 | 691.00 | 1.46 |
| 7 | PP1 + Stabilizer 0.25% wt | 320.28 | 166.32 | 59.00 | 122.58 | −32.88 | 13.99 | 0.47 | 430.00 | 0.91 |
| 8 | PP1 + CHP | 189.12 329.03 | 162.57 | 44.80 | 122.34 | −36.30 | — | 0.32 | 670.00 | 1.42 |

TABLE 3-continued

| | Example Description | Td °C. | Tm °C. | Crystallinity % | Tc °C. | Tg 1 °C. | Tg 2 °C. | Young's Modulus (MPa) | Elong. %[a] | Elong. Ratio |
|---|---|---|---|---|---|---|---|---|---|---|
| 9 | PP1 + PEG-diamine in CHP | 184.74 319.71 | 161.39 | 45.55 | 123.24 | −36.14 | 1.24 | 0.32 | 656.00 | 1.39 |

[a]ASTM D638 initial die height was 39.0 mm.

The results in Table 3 show that CHP-gel with stabilizer slightly increased the final decomposition temperature Td of the formulations and decreased the Young's modulus by about 31% (desired) over Control 2. The % elongation at break increased by up to 46% over Control 2, resulting in an elongation ratio between 1.39 and 1.46. Stabilizer alone (Example 7) was not effective in raising the % elongation at break or lowering the Young's modulus.

Effect of PF and PEG-Diamine on CHP Extrusion Composition

Example 10

To determine effects of PF and PEG-diamine on the final product, a mixture was prepared containing CHP (10.0 g, 9.97 wt %), PP (90.0 g, 89.78 wt %), and BHT (0.25 g, 0.24 wt %). No PEG-diamine or PF was added to this mixture. The mixture was extruded at 220° C. The thermal and mechanical properties of the samples collected were similar to the formulation of Example 8, Table 3.

The above examples show that CHP-gel and CHP provide extruded samples having similar properties. However, homogeneous extruded samples were more difficult to achieve using CHP-gel.

Effect of Antioxidants (Stabilizers)

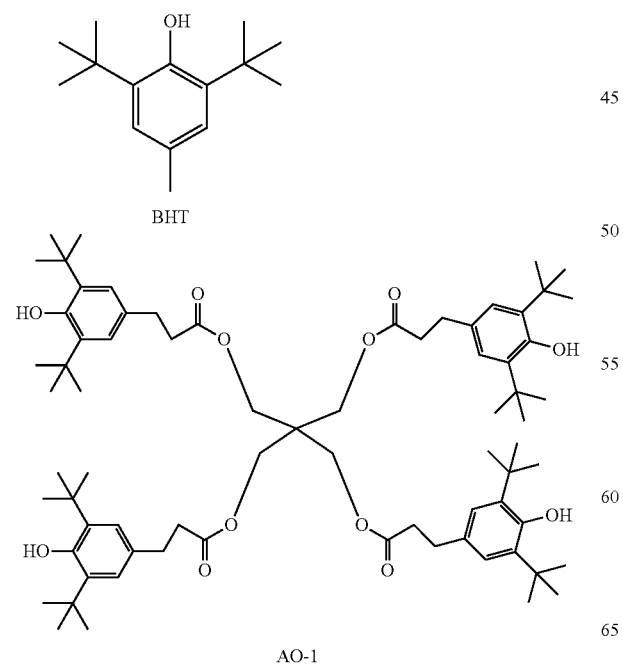

BHT

AO-1

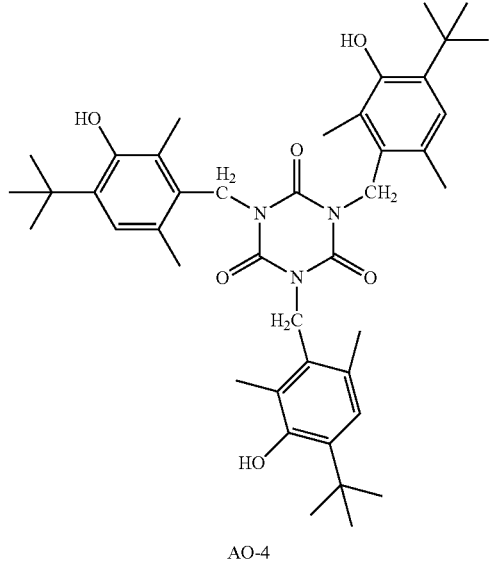

AO-4

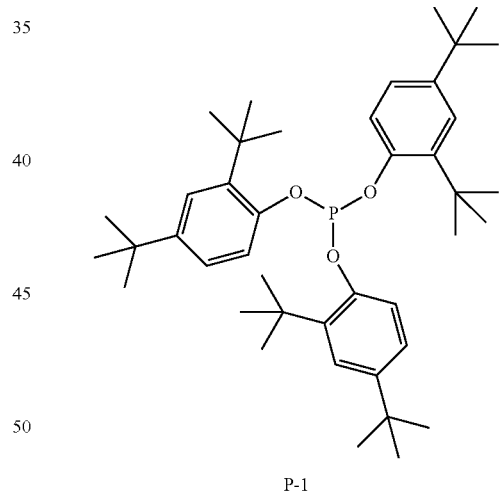

P-1

Examples 11-19

Antioxidant stabilizers were included in PP1 formulations to mitigate oxidation/degradation of PP1 when heated at temperatures >200° C. and/or when exposed to sunlight. Several stabilizers (BHT, AO-1, AO-4, and P-1) were tested singularly or in combination. The stabilizer(s) were added to PP1 in an amounts in the range of 0.25 wt % to 0.75 wt % based on total weight of the initial mixture. The initial mixtures were heated and extruded according to the general procedure of Example 6.

Example 11

Pure PP1, no stabilizer.

Example 12

PP1+BHT (0.25 wt %).

Example 13

PP1+AO-1 (0.25 wt %).

Example 14

PP1+AO-4 (0.25 wt %).

Example 15

PP1+P-1 (0.25 wt %).

Example 16

PP1+AO-1 (0.125 wt %)+P-1 (0.125 wt %).

Example 17

PP1+AO-4 (0.125 wt %)+P-1 (0.125 wt %).

Example 18

PP1+AO-4 (0.25 wt %)+P-1 (0.5 wt %).

Example 19

PP1+AO-1 (0.25 wt %)+P-1 (0.5 wt %).

Table 4 summarizes the properties of the samples of Examples 11-19.

The results in Table 4 provide further evidence that the stabilizers alone do not significantly change the Young's modulus or % elongation at break over Control 2 in a desirable direction.

Figure 3:
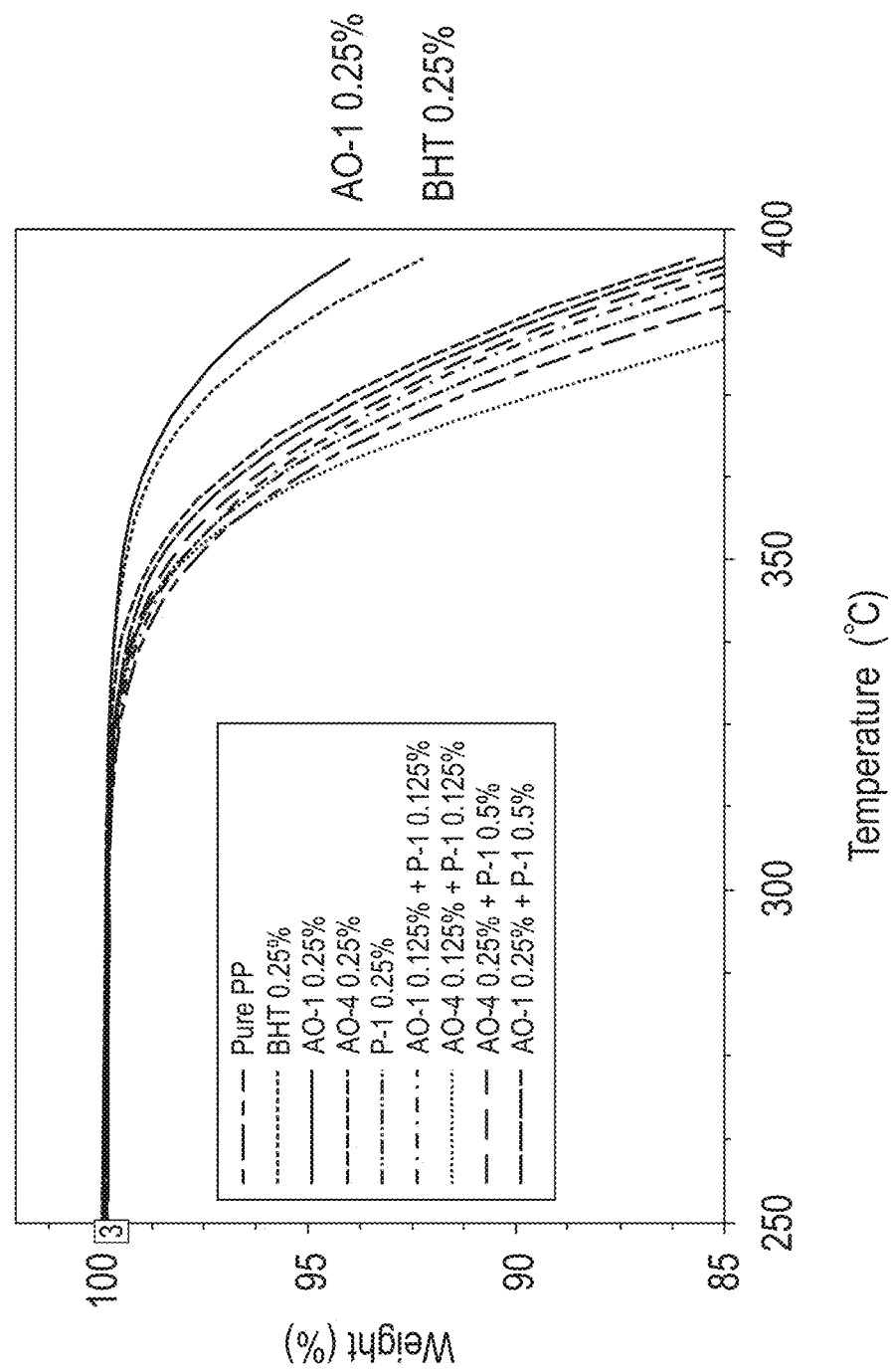
FIG. 3 is a graph showing the thermogravimetric analysis of Examples 11-19.

Thermogravimetric (TGA) analysis (FIG. 3, graph) of the extruded samples indicates that BHT (0.25 wt %) and AO-1 (0.25 wt %) were similarly effective in increasing the thermal stability of as-purchased PP1 pellets. AO-4 and P-1 were less effective.

Effect of CHP Level

Examples 20-23

Initial mixtures were prepared containing CHP in amounts of 5 wt % (Example 20), 10 wt % (Example 21), 15 wt % (Example 22), and 20 wt % CHP (Example 23), with the balance being PP. The mixtures were heated and extruded according to the general procedure of Example 6. 5 wt % CHP did not modify the thermal and mechanical properties of the final product. The extruded samples had similar properties to the as-purchased PP pellets. Amounts of 15 wt % and 20 wt % CHP could mix with PP pellets, but these amounts were excessive, leading to CHP accumulating at the bottom of flask causing lags and gas evolution during the extrusion process. 10 wt % CHP showed the optimal performance as it blended with PP pellets before and after extrusion, did not cause lags or gas evolutions, and advanced the properties of the final extruded samples.

Table 5 summarizes the properties of the samples of Examples 20-23.

TABLE 4

| Example | Description | Td °C. | Tm °C. | Crystallinity % | Tc | Tg 1 °C. | Tg 2 °C. | Modulus °C. | Young's Elong. (MPa) | Elong. %[a] | Ratio |
|---|---|---|---|---|---|---|---|---|---|---|---|
| Control 1 | As-purchased PP1 | 311.00 | 168.79 | 47.60 | | 117.94 | — | — | — | — | — |
| Control 2 (11) | Extruded PP plus no stabilizer | 317.13 | 167.17 | 69.66 | | 119.34 | −36.44 | 15.09 | 0.46 | 472.00 | |
| 12 | PP1 + BHT (0.25 wt %) | 320.28 | 166.32 | 59.00 | | 122.58 | −32.88 | 13.99 | 0.47 | 430.00 | 0.91 |
| 13 | PP1 + AO-1 (0.25 wt %) | 321.58 | 166.45 | 59.50 | | 125.36 | −34.42 | 14.23 | 0.46 | 442.00 | 0.93 |
| 14 | PP1 + AO-4 (0.25 wt %) | 316.52 | 167.58 | 65.35 | | 120.87 | −35.21 | 15.67 | 0.46 | 440.50 | 0.93 |
| 15 | PP1 + P-1 (0.25 wt %) | 317.96 | 165.27 | 61.47 | | 119.96 | −34.60 | 14.70 | 0.45 | 461.00 | 0.97 |
| 16 | PP1 + AO-1 (0.125 wt %) + P-1 (0.125 wt %) | 315.20 | 167.02 | 57.63 | | 124.30 | −33.52 | 14.59 | 0.46 | 418.00 | 0.88 |
| 17 | PP1 + AO-4 (0.125 wt %) + P-1 (0.125 wt %) | 317.98 | 164.25 | 60.35 | | 124.56 | −32.44 | 15.20 | 0.47 | 433.00 | 0.92 |
| 18 | PP1 + AO-4 (0.25 wt %) + P-1 (0.5 wt %) | 316.70 | 169.21 | 59.26 | | 124.49 | −33.72 | 13.87 | 0.46 | 448.00 | 0.94 |
| 19 | PP1 + AO-1 (0.25 wt %) + P-1 (0.5 wt %) | 314.20 | 167.28 | 61.34 | | 125.63 | −32.50 | 14.53 | 0.46 | 435.00 | 0.92 |

TABLE 5

| Example | Description | Td °C. | Tm °C. | Crystallinity % | Tc °C. | Tg 1 °C. | Tg 2 °C. | Young's Modulus (MPa) | Elong. %[a] | Elong. Ratio |
|---|---|---|---|---|---|---|---|---|---|---|
| Control 1 | As-purchased PP3 | 404.48 | 165.34 | 47.22 | 124.10 | — | — | — | — | — |
| Control 2 | Extruded PP3 | 352.43 | 163.13 | 42.60 | 125.05 | −42.41 | 15.21 | 0.22 | 1149 | — |
| 20 | PP3 + CHP 5 wt % | 350.19 | 163.87 | 42.35 | 125.33 | −42.18 | 16.32 | 0.23 | 1151 | 1.00 |
| 21 | PP3 + CHP 10 wt % | 366.25 | 160.35 | 41.11 | 125.31 | −39.20 | 9.06 | 0.13 | 1374 | 1.20 |
| 22 | PP3 + CHP 15 wt % | 365.87 | 160.21 | 40.43 | 125.10 | −39.08 | 8.96 | 0.14 | 1378 | 1.19 |
| 23 | PP3 + CHP 20 wt % | 362.23 | 162.15 | 41.37 | 124.80 | −38.10 | 9.10 | 0.13 | 1370 | 1.19 |

The results in Table 5 show the effective level of CHP was greater than 5 wt % and less than or equal to about 10 wt % of the formulation. The properties of Example 20 (5 wt %) were comparable to Control 2, whereas the properties of Example 22 (15 wt %) were comparable to Example 21 (10 wt %).

Effect of PDMS-Diamine

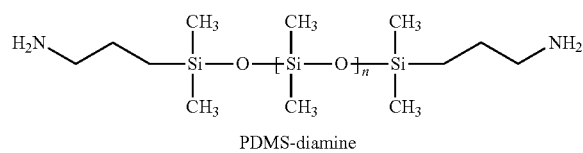

PDMS-diamine

Example 24

An organogel was prepared using the general procedure of Example 2, substituting PEG-diamine with PDMS-diamine (boiling point >200° C.). The organogel was partially stable at 90 wt % CHP. It was noted lower levels of CHP can form more stable gels.

Example 25

An initial mixture was prepared containing PP1 pellets (supplied by manufacturer, 90.0 g, 89.78 wt %), PDMS-diamine (1.0 g, 1 wt %), CHP (9.0 g, 8.97 wt %), and AO-1 (0.25 g, 0.24 wt %). Using the general procedure of Example 6, the initial mixture was heated and extruded, resulting in separation of materials (PDMS-diamine and PP1) and sudden gas evolution during the extrusion, bubbles in the final product, and PDMS-diamine leaching from the extruded samples when pressed.

Example 26

Using the general procedure of Example 6, an extrusion formulation was prepared containing PP1 pellets (supplied by manufacturer, 98.0 g, 0.98 wt %), PDMS-diamine (1.0 g, 1 wt %), and BHT (0.25 g, 0.25 wt %). Extrusion of the product at 220° C. resulted in separation of materials (PDMS-diamine and PP1) and sudden gas evolution during the extrusion, bubbles in the final product, and PDMS-diamine leaching from the extruded samples when pressed.

The samples of Examples 25-26 were not of sufficient quality to measure the properties.

Effect of Solvent Additive

Four solvents were tested with PP2: CHP, propylene carbonate (CAS # 108-32-7; boiling point 240° C.), ethylene carbonate (CAS # 96-49-1, boiling point 243° C.), and tetraglyme (CAS # 143-24-8, boiling point 220° C.). Initial mixtures were prepared using the solvent (10.0 g, 9.98 wt %) with PP2 pellets (90.0 g, 89.78 wt %) and BHT (0.25 g, 0.24 wt %).

Example 27

Figure 4A:
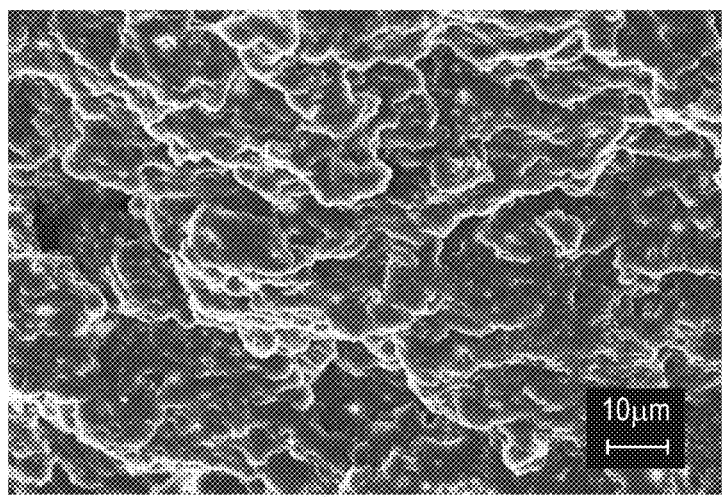
FIG. 4A is a scanning electron micrograph (SEM) of extruded as-purchased poly(propylene), PP2.
Figure 4B:
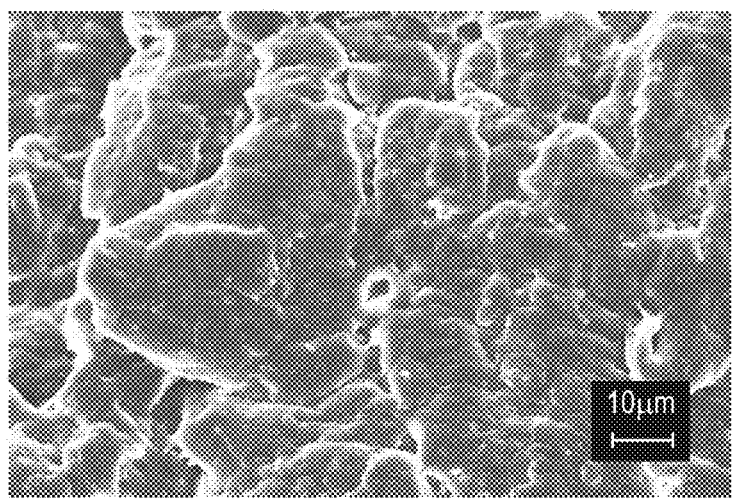
FIG. 4B is a SEM of extruded Example 27 containing liquid additive N-cyclohexyl pyrrolidone (CHP), which produced no gas evolution or bubbles.

CHP formulation. CHP blended well with PP2. This formulation did not result in gas evolution and bubbles during extrusion (FIG. 4B, SEM). For comparison, FIG. 4A is an SEM of extruded as-purchased PP2 containing no added solvent.

Example 28

Figure 4C:
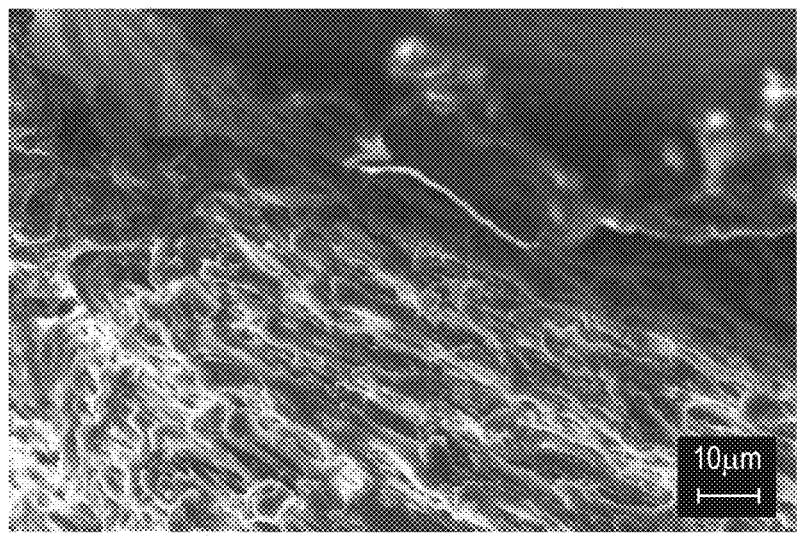
FIG. 4C is a SEM of extruded Example 28 containing propylene carbonate as the liquid additive, which produced no gas evolution or bubbles.

Propylene carbonate formulation. Propylene carbonate blended well with PP2. This formulation did not result in gas evolution or bubbles during extrusion (FIG. 4C, SEM).

Example 29

Figure 4D:
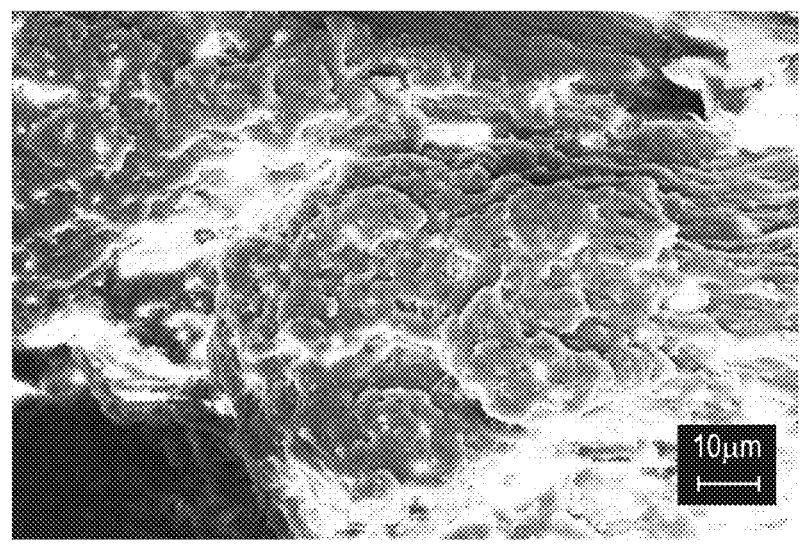
FIG. 4D is a SEM of extruded Example 29 containing ethylene carbonate as the liquid additive, which produced gas evolution, bubbles, and resulted in materials separation (solvent leaching).

Ethylene carbonate formulation. This formulation caused gas evolutions, bubbles, and materials separation, resulting in solvent leaching from the final extruded samples (FIG. 4D, SEM).

Example 30

Figure 4E:
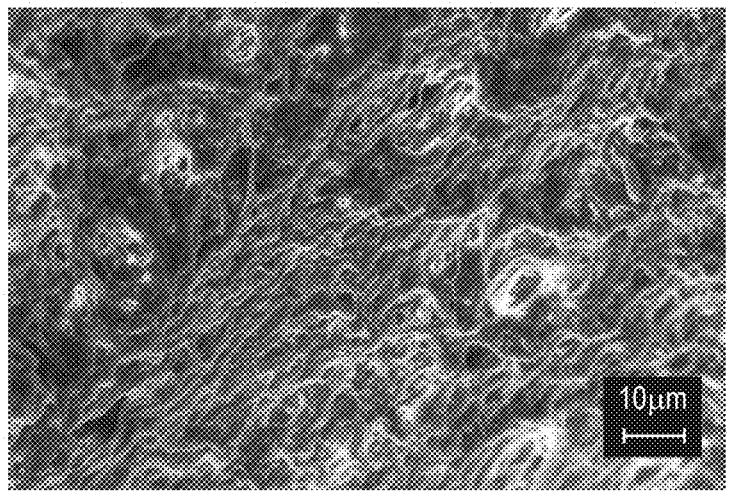
FIG. 4E is a SEM of extruded Example 29 containing tetraglyme as the liquid additive, which produced gas evolution, bubbles, and resulted in materials separation (solvent leaching).

Tetraglyme formulation. This formulation caused gas evolutions, bubbles, and materials separation, resulting in solvent leaching from the final extruded samples (FIG. 4E, SEM).

Table 6 summarizes the properties of Examples 27-30.

TABLE 6

| Example | Description | Td °C. | Initial Weight Loss % in TGA | Tm °C. | Crystallinity % | Tc °C. | Tg 1 °C. | Tg 2 °C. | Elong. %[a] | Elong. ratio |
|---|---|---|---|---|---|---|---|---|---|---|
| Control 1 | As-purchased PP2 | 309 | — | 168 | 46 | 122 | — | — | — | |
| Control 2 | Extruded PP2 | 295 | — | 166 | 52 (69) | 123 | −36 | 13 | 425 | |
| 27 | PP2 + CHP | 86; 338 | 5.2 | 158 | 46 | 126 | −40 | — | 699 | 1.64 |
| 28 | PP2 + Propylene carbonate | 100; 321 | 2.9 | 165 | 62 | 126 | −32 | 17 | 438 | 1.03 |
| 29 | PP2 + Ethylene Carbonate | 101; 302 | 1.8 | 165 | 57 | 126 | −39 | 13 | 436 | 1.03 |
| 30 | PP2 + tetraglyme | 100; 302 | 3.1 | 165 | 57 | 127 | −27 | — | 463 | 1.09 |

[a]ASTM D638 initial die height was 39.0 mm.

The results in Table 6 indicate CHP was more effective than propylene carbonate, ethylene carbonate, and tetraglyme in raising the % elongation at break and elongation ratio relative to Control 2. The latter three solvents (Examples 28-30) only slightly improved % elongation at break and elongation ratio over Control 2.

Modeling studies

To understand why CHP improves the properties of final extruded PP samples versus other solvents, a computational analysis was performed, modeling the monomer interactions between propylene in various states of oxidation with the solvents. The results indicated CHP has the highest affinity to form interactions through dispersion forces, and has the greatest potential to form hydrogen bonds with oxidized PP. Without wishing to being bound by theory, oxidation can potentially occur with PP and CHP during extrusion at 220° C., resulting in hydrogen-bonding of CHP with PP in the final samples. This might account for the improved thermal and mechanical properties of the CHP formulations compared to the as-purchased PP pellets also.

To understand whether any oxidation occurs during the extrusion process, samples of as-purchased PP pellets, extruded as-purchased PP pellets with no solvent additive, and extruded samples containing PP, CHP, and BHT were examined using X-ray photoelectron spectroscopy (XPS) to determine the percent of surface oxygen of each sample. The results indicated that the extent of oxidation was less for samples containing CHP and BHT. Without wishing to being bound by theory, this could be due to the oxidized PP pellets and CHP forming hydrogen bonds as described above. These results were also consistent across the four distinct PP batches tested.

Effect of Additives PAPA, PSPA or Pluronic F-127

If 10 wt % CHP is in the pre-extruded blend, the extruded blend should contain 9-10 wt % CHP. However, TGA analysis of extruded samples indicated that the extruded samples contained only 5-6 wt % CHP out of 9.98 wt % of the pre-extruded formulation. To increase the wt % of the solvent additive in the extruded samples, PP pellets, CHP, and BHT were co-extruded with 5-10 wt % poly(azelaic anhydride) (PAPA), poly(sebacic anhydride) (PSPA), or PLURONIC® F-127 (registered trademark of BASF, commercially available through Sigma Aldrich).

Example 31

PAPA.

Example 32

PSPA.

Example 33

PLURONIC® F-127.

Each of the above additives caused gas evolution and excessive material separation in the extruded samples.

The samples of Examples 31-33 were not of sufficient quality to measure the properties.

Effect of Pre-Extrusion Heating Time/Temperature

Example 34

PP (90.0 g, 89.78 wt %), CHP (10.0 g, 9.98 wt %) and BHT (0.25 g 0.24 wt %) were combined in a flask and heated in an oil bath at 160-180° C. for 3 hours, allowing gas evolution to occur prior to the extrusion and generate an evenly distributed mixture. This blend extruded smoothly with less solvent additive being trapped in the extruder.

Example 35

To study the effect of oven temperature on the formulation, the same formulation as Example 30 was heated in an oven at 120° C. for 3 hours. Every hour the mixture was checked and manually stirred for 30 seconds to ensure the components were well-mixed. This blend was extruded smoothly at 220° C., comparable to the as-purchased PP pellets, with no incidents of solvent additive being trapped in the extruder, gas evolution, bubbles, or solvent additive leaching under press. TGA analysis of the extruded samples showed they contained 8-10 wt % CHP.

Example 36

Cutting CHP-gel into small pieces using a razor did not overcome the difficulty of blending CHP-gel with PP pellets. The final extruded product remained heterogeneous. As a result, the oven-heat step of Example 31 was attempted with formulations using CHP-gel. PP (90.0 g, 89.78 wt %) and BHT (0.25 g, 0.24 wt %) were combined, followed by CHP-gel (10.0 g, 9.98 wt %), placing the gel on top of the PP and BHT mix. The flask was placed in an oven at 120° C. for 3 hours. Every hour, the mixture was manually stirred for 30 seconds to ensure components mixed well. After 3 hours, the formulation appeared evenly mixed. The formulation was then extruded at 220° C., producing a homogeneous final product with no gas evolution, air bubbles, or materials separation.

Table 7 summarizes the properties of Examples 34-36.

TABLE 7

| Example | Description | $T_d$ °C. | $T_m$ °C. | Crystallinity % | $T_c$ °C. | $T_g$ 1 °C. | $T_g$ 2 °C. | Young's Modulus (MPa) | Elong. %[a] | Elong. Ratio |
|---|---|---|---|---|---|---|---|---|---|---|
| Control 1 | As-purchased PP3 | 404.48 | 165.34 | 47.22 | 124.10 | — | — | — | — | — |
| Control 2 | Extruded PP3 | 352.43 | 163.13 | 42.60 | 125.05 | −42.41 | 15.21 | 0.22 | 1149 | — |
| 34 | PP3 + CHP 10 wt % (oil bath heat) | 363.17 | 160.00 | 40.40 | 124.30 | −40.15 | 8.58 | 0.14 | 1370 | 1.20 |
| 35 | PP3 + CHP 10 wt % (oven heat) | 366.25 | 160.35 | 41.11 | 125.31 | −39.20 | 9.06 | 0.13 | 1374 | 1.20 |
| 36 | PP3 + CHP-gel 10 wt % (oven heat) | 362.37 | 160.21 | 38.36 | 125.41 | −42.10 | 1.5 | 0.14 | 1270 | 1.11 |

The results in Table 7 indicate similar beneficial effects on Young's modulus, % elongation, and elongation ratio relative to Control 2 using the different time/temperature mixing conditions.

Summary of Properties of PP1 and PP2 Extruded Samples

Table 8 summarizes the properties of extrusion samples prepared with PP1 and PP2.

TABLE 8

| | Description | $T_d$ (° C.) | Initial Weight Loss % in TGA | $T_m$ (° C.) | Crystallinity % | $T_c$ (° C.) | $T_g$ 1 (° C.) | $T_g$ 2 (° C.) | Elong. % (old die)[a] | Young's Modulus (MPa) | Yield point (Stress at Yield) (dσ/dε = 0) |
|---|---|---|---|---|---|---|---|---|---|---|---|
| PP 1 | As-purchased PP1 pellets | 311 | — | 169 | 48 | 118 | — | — | — | — | — |
| | PP1 extruded | 317 | — | 167 | 70 | 119 | −36 | 15 | 472 | 0.46 | N/A |
| | PP 1 + CHP (10 wt %) + BHT (0.25 wt %) | 329 | 5-6 | 161 | 46 | 123 | −36 | 1.2 | 670 | 0.32 | N/A |
| | PP1 + CHP-gel (10 wt %) + BHT (0.25 wt %) | 337 | 3-5 | 162 | 47 | 124 | −36 | 6.5 | 691 | 0.32 | N/A |
| PP 2 | As-purchased PP2 pellets | 309 | — | 168 | 46 | 122 | — | — | — | — | — |
| | PP2 extruded | 295 | — | 166 | 52 | 123 | −36 | 13 | 425 | 0.44 | N/A |
| | PP2 + CHP (10 wt %) + BHT (0.25 wt %) | 338 | 5-7 | 158 | 46 | 126 | −40 | — | 699 | 0.34 | N/A |

[a]ASTM D638 initial die height was 39.0 mm.

Summary of Properties using PP3

Table 9 summarizes the properties of extrusion samples prepared with PP3.

TABLE 9

| Experiment | Td (° C.) | Initial Weight Loss % in TGA | Tm (° C.) | Crystallinity % | Tc (° C.) | Tg 1 (° C.) | Tg 2 (° C.) | Elong. %[a] (old die) | Elong. %[b] (New die) | Young's Modulus (MPa) | Yield point (Stress at Yield) (dσ/dε = 0) | Shrinkage % (average of 450 s) |
|---|---|---|---|---|---|---|---|---|---|---|---|---|
| As-purchased PP3 pellets | 404 | / | 165 | 47 | 124 | / | / | / | / | / | / | / |
| PP3 extruded | 352.4 | / | 163 | 42 | 125 | −42 | 15 | 666 | 1149 | 0.22 | 17.0 | −9.0 |
| PP3 + CHP (10 wt %) + BHT (0.25 wt %) | 366 | 8-10 | 160 | 41 | 125 | −39 | 9 | 782 | 1374 | 0.13 | 13.9 | −5.9 |
| PP3 + CHP-gel (10 wt %) + BHT (0.25 wt %) | 362 | 9-10 | 160 | 38 | 125 | −42 | 1.5 | / | 1270 | 0.14 | 14.0 | / |

[a]ASTM D638 initial die height was 39.0 mm.
[b]ASTM D638 initial die height was 25.4 mm.

Summary of properties using PP4

Table 10 summarizes the properties of extrusion samples prepared with PP4.

TABLE 10

| | Experiment | Td (° C.) | Initial Weight Loss % in TGA | Tm (° C.) | Crystallinity % | Tc (° C.) | Tg 1 (° C.) | Tg 2 (° C.) | Elong. % (old die)[a] | Elong. % (new die)[b] | Young's Modulus (MPa) | Yield point (Stress at Yield) (dσ/dε = 0) | Shrinkage % (average of 450 s) |
|---|---|---|---|---|---|---|---|---|---|---|---|---|---|
| Extruded at 180° C. | As-purchased PP4 pellets | 362 | — | 135 | 46 | 101 | — | — | — | — | — | — | — |
| | PP4 extruded | 321 | — | 143 | 40 | 101 | 0.61 | — | 764 | 1466 | 0.18 | 17 | −2.0 |
| | PP4 + CHP (10 wt %) + BHT (0.25 wt %) | 337 | 5-10 | 142 | 40 | 102 | −42 | — | 985 | 1664 | 0.09 | 12 | −2.8 |
| Extruded at 200° C. | As-purchased PP4 pellets | 362 | — | 135 | 46 | 101 | — | — | — | — | — | — | — |
| | PP4 extruded | 308 | — | 134 | 42 | 101 | 5.92 | — | 892 | 1370 | 0.17 | 17 | −4.2 |
| | PP4 + CHP (10 wt %) + BHT (0.25 wt %) | 352 | 5-10 | 133 | 37 | 102 | −50.0 | — | 1000 | 1679 | 0.10 | 13 | −4.2 |

[a]ASTM D638 initial die height was 39.0 mm.
[b]ASTM D638 initial die height was 25.4 mm.

Summary of Changes in Extrusion Properties by Addition of CHP

Table 11 summarizes the changes in the properties of each poly(propylene) containing 11 wt % CHP.

TABLE 11

| Property | PP1 | PP2 | PP3 | PP4 (180° C., 200° C.) |
|---|---|---|---|---|
| Elongation % Increase | 42% | 65% | 20% | 14%, 23% |
| Young's Modulus Decrease | −30% | −23% | −41% | −50%, −41% |
| Crystallinity % compared to as-purchased pellets extruded | Decreases | Decreases | No change/ slight decrease | No change/ slight decrease |

TABLE 11-continued

| | Property | PP1 | PP2 | PP3 | PP4 (180° C., 200° C.) |
|---|---|---|---|---|---|
| | Reduced Tg | Yes - especially Tg 2 | Yes - Tg 2 disappears | Yes - especially Tg 2 | Yes - significantly Tg 1 |
| | Strain Hardening | Yes - significant | Yes - significant | Yes | Yes |
| | Improved Thermal Stability | Yes | Yes | Yes | Yes |
| | Decreased Shrinkage of Extruded Material | No Data | No Data | Yes | Yes - slightly |
| Finite Element Analysis (FEA) | End of Overlap at maximum strain | −26% | −20% | −39% | −42% |
| | Top angle at maximum strain | −23% | −17% | −31% | −36% |

The above property changes induced by CHP, particularly in % elongation and Young's modulus, indicate the deficiencies of as-purchased poly(propylene) in commercial pipeline applications may be overcome by incorporating CHP or other high boiling lactams in the extrusion melt.

With respect to the finite element analysis (FEA), the analytical model detected the bonding and a strain value (the point at which the material is loading) required to disbond on the overlap (theoretically) and to a lesser extent top angle, which is at the top of the injection and at the interface with the 30 degree chamfer. The analysis focused on the "interface" between the parent coating and the field joint coating. This is where the solid PP from the field joint coating (where the disclosed PP compositions would be used) bonds to the syntactic PP of the parent pipe coating. In two areas particularly, end of overlap and the top angle, strain levels are of significant importance, as they are believed to be closely linked to the failure and/or cracking of the final assembly.

The FEA was performed using a previous project geometry (phase 1), and modifying the solid PP material properties of phase 1 with those obtained above. The values of Table 11 are the percent change in strain results in the two focus areas. A negative change is a desirable outcome, as it suggests that the overall final assembly is less likely to fail/crack. Thus, the FEA analysis was favorable for the present compositions using the four different PP starting materials.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A composition, comprising:
   between 85 wt% and 95 wt% of poly(propylene); and
   between 15 wt% and 5 wt% of a liquid additive in contact with the poly(propylene), the liquid additive being a compound of formula (1):

wherein
   n is a positive integer having a value of 2 to 6,
   R' is a monovalent $C_1$-$C_7$ alkyl or cycloalkyl group,
   each $R^a$ is an independent monovalent radical selected from the group consisting of hydrogen and $C_1$-$C_{10}$ alkyl groups, and
   each $R^b$ is an independent monovalent radical selected from the group consisting of hydrogen, and $C_1$-$C_{10}$ alkyl groups;
wherein
   wt % is based on total weight of the composition.

2. The composition of claim 1, wherein the composition is suitable for forming a field joint coating of a pipeline.

3. The composition of claim 1, wherein
   the composition is capable of undergoing an extrusion to form an extruded composition, wherein the extruded composition has a percent elongation at break equal to X, wherein X is a number greater than 0,
   the poly(propylene) alone is capable of undergoing the extrusion to form an extruded poly(propylene), wherein the extruded poly(propylene) has a percent elongation at break equal to Y, wherein Y is a number greater than 0, and
   X divided by Y is at least 1.20.

4. The composition of claim 1, wherein R' is a monovalent $c_1$-$C_7$ alkyl group.

5. The composition of claim 4, wherein each of $R^a$ and $R^b$ is hydrogen, and R' is monovalent cycloalkyl group.

6. The composition of claim 1, wherein the liquid additive is N-cyclohexyl pyrrolidone (CHP).

7. The composition of claim 1, wherein the composition comprises 0.1 wt % to 1 wt % of an antioxidant stabilizer.

8. The composition of claim 7, wherein the antioxidant stabilizer comprises a phenolic group.

9. The composition of claim 7, wherein the antioxidant stabilizer is selected from the group consisting of 2,6-di-tert-butyl-4-methylphenol (BHT), pentaerythritol tetrakis(3-(3,5-di-tert-butyl-4-hydroxyphenyl)propionate (AO-1), 1,3,5-Tri(4-tert-butyl-2,6- dimethyl-3-hydroxybenzyl)-1,3,5-triazine-2,4,6(1H,3H,5H)-trione (AO-4), tris (2,4-di-tert-butylphenyl)phosphite (P-1), and combinations thereof.

10. The composition of claim 1, wherein the composition comprises 0.8 wt % to 2 wt % of a polyhemiaminal.

11. The composition of claim 10, wherein the polyhemiaminal comprises a poly(ethylene oxide) chain segment.

12. The composition of claim 10, wherein the polyhemiaminal comprises a poly(dimethylsiloxane) chain segment.

13. The composition of claim 1, wherein the composition comprises an ultraviolet light absorber.

14. The composition of claim 1, wherein the composition comprises a surfactant.

15. A method, comprising:
heating the composition of claim 1 with agitation at a temperature in the range of 90° C. to 120° C. for a period of time sufficient to form a homogeneous melt, wherein the liquid additive has a boiling point, and
extruding the melt at a temperature below the boiling point of the liquid additive, thereby forming an extruded composition.

16. The method of claim 15, wherein the boiling point of the liquid additive is greater than 220° C. at a pressure of 1 atmosphere.

17. The method of claim 15, wherein the extrusion is performed at a temperature between 90° C. and 220° C.

18. The method of claim 15, wherein the extruded composition has a percent elongation at break of at least 1.2 times the percent elongation at break of the poly(propylene).

19. The method of claim 15, wherein the extruded composition has a Young's modulus that is 23% to 50% less than the Young's modulus of the poly(propylene).

20. The method of claim 15, wherein the extruded composition is more resistant to fracture compared to the poly(propylene).

21. The method of claim 15, wherein the extruded composition is suitable for forming a field joint coating of a pipeline.

22. An extruded composition formed by the method of claim 15.

23. A method, comprising:
applying the composition of claim 1 onto a weld joint, the weld joint joining two parent pipes end-to-end; and
heating the applied composition, thereby forming a field joint coating disposed on the weld joint.

24. The method of claim 23, wherein each of the two parent pipes comprises a parent coating disposed on a cylindrical core, and the field joint coating overlaps the parent coating.

25. The method of claim 24, wherein the parent coating comprises poly(propylene).

26. The method of claim 23, wherein the composition is applied to the weld joint by injecting a melt of the composition into a mold cavity surrounding the weld joint, thereby forming the field joint coating.

* * * * *